United States Patent
Herman et al.

Patent Number: 6,075,905
Date of Patent: Jun. 13, 2000

[54] METHOD AND APPARATUS FOR MOSAIC IMAGE CONSTRUCTION

[75] Inventors: Joshua Randy Herman, deceased, late of Robbinsville, by Karen H. Herman, executrix; James Russell Bergen, Hopewell, both of N.J.; Shmuel Peleg, Jerusalem, Israel; Vincent Paragano, Lawrenceville, N.J.; Douglas F. Dixon, Hopewell, N.J.; Peter J. Burt, Princeton, N.J.; Harpreet Sawhney, Plainsboro, N.J.; Gary A. Gendel, Neshanic Station, N.J.; Rakesh Kumar, Dayton, N.J.; Michael H. Brill, Morrisville, Pa.

[73] Assignee: Sarnoff Corporation, Princeton, N.J.

[21] Appl. No.: 08/896,887

[22] Filed: Jul. 18, 1997

Related U.S. Application Data

[60] Provisional application No. 60/021,925, Jul. 17, 1996.

[51] Int. Cl.⁷ .................................................. G06K 9/36
[52] U.S. Cl. ........................ 382/284; 382/294; 348/588
[58] Field of Search ................................... 382/154, 236, 382/284, 278, 293, 294, 162, 107; 345/423, 427, 435; 348/584, 588, 598; 358/450

[56] References Cited

U.S. PATENT DOCUMENTS

| | | | |
|---|---|---|---|
| 4,758,892 | 7/1988 | Bloomfield | 358/183 |
| 4,797,942 | 1/1989 | Burt | 382/41 |
| 5,067,014 | 11/1991 | Bergen et al. | 358/105 |
| 5,187,754 | 2/1993 | Currin et al. | 382/54 |
| 5,202,928 | 4/1993 | Tomita et al. | 382/1 |
| 5,259,040 | 11/1993 | Hanna | 382/41 |
| 5,264,933 | 11/1993 | Rosser et al. | 358/183 |
| 5,325,449 | 6/1994 | Burt et al. | 382/56 |
| 5,353,392 | 10/1994 | Luquet et al. | 395/135 |
| 5,394,520 | 2/1995 | Hall | 395/135 |
| 5,488,674 | 1/1996 | Burt et al. | 382/284 |
| 5,515,181 | 5/1996 | Iyoda et al. | 358/474 |
| 5,566,251 | 10/1996 | Hanna et al. | 382/284 |
| 5,649,032 | 7/1997 | Burt et al. | 382/284 |
| 5,657,402 | 8/1997 | Bender et al. | 382/284 |

OTHER PUBLICATIONS

Burt, et al, "Merging Images Through Pattern Decomposition" David Sarnoff Research Center, SPIE vol. 575 Applications of Digital Image Processing VIII(1985), pp. 173–180.

Bergen, et al, "Hierarchial Model–Based Estimation" David Sarnoff Research Center, Mar. 23, 1992, pp. 1–21 To Appear in "Proc. Of European Conference on Computer Vision–92".

Burt, et al, A Multiresolution Spline With Application to Image Mosaics, David Sarnoff Research Center, ACM Transactions on Graphics, vol. 2, No. 4, Oct. 1983, pp. 217–236.

Hanna, et al, "Combining Stereo and Motion Analysis for Direct Estimation of Scene Structure", David Sarnoff Research Center, To Appear In Proc. Fourth Int. Co., on Computer Vision (ICCV '93), Berlin, Germany. May 1993.

"Direct Methods for Visual Scene Reconstruction", Richard Szeliski and Sing Bing Kang, Cambridge Research Lab. 1995 IEEE.

(List continued on next page.)

*Primary Examiner*—Bhavesh Mehta
*Attorney, Agent, or Firm*—William J. Burke

[57] ABSTRACT

A method of constructing an image mosaic comprising the steps of selecting source images, aligning the source images, selecting source segments, enhancing the images, and merging the images to form the image mosaic is disclosed. An apparatus for constructing an image mosaic comprising means for selecting source images, means for aligning the source images, means for selecting source image segments, means for enhancing the images, and means for merging the images to form the image mosaic is also disclosed. The process may be performed automatically by the system or may be guided interactively by a human operator. Applications include the construction of photographic quality prints form video and digital camera images.

39 Claims, 9 Drawing Sheets

OTHER PUBLICATIONS

"Sensitivity of the Pose Refinement Problem to Accurate Estimation of Camera Parameters", Rakesh Kumar and Allen R. Hanson, University of Massachusetts at Amherst, Dec. 1990.

"Plenoptic Modeling: An Image–Based Rendering System" Leonard McMillan and Gary Bishop Department Computer Science University of North Carolina at Chapel Hill, Computer Graphics Proceedings, Annual Conference Series, 1995. pp39–45.

"Robust Structure from Motion using Motion Parallax", Robert Cipolla University of Cambridge Yasukasu Okamoto and Yoshinori Kuno, Toshiba Corporation. 1933 IEE.

"Direct multi–resolution estimation of ego–motion and structure from motion", K.J. Hanna, David Sarnoff Research Center, 1991 IEEE, pp 156–162.

"Simplifying Multiple Motion and Structure Analysis Using Planar Parallax and Image Warping", Harpreet S. Sawhney, IBM Almaden Research Center. 1994 IEEE. pp 104–1.

"Image Mosaicing for Tele–Reality Applications", Richard Szeliski, Cambridge Research Lab. 1994 IEEE pp 44–53.

"Real–Time Compositing System of a Real Camera Image and a Computer Graphic Image", K. Haseba, A. Suzuki, K. Publication No. 397. IEEE, 1994.

McLean, "Structured Video Coding" Submitted to the Media Arts and Sciences Section, School of Architecture and Planning in partial fulfillment of the requirements for the degree of Master of Science at the Massachusetts Instute of Technology, Jun. 1991.

"Robust Methods for Estimating Pose and a Sensitivity Analysis", Rakesh Kumar, David Hanson, Computer Science Department, University of Massachusetts at Amherst, Massachusetts 01003. Accepted Mar. 9, 1994.

CVGIP: Image Understanding, vol. 60, No. 3, Nov., pp. 313–342, 1994.

Isolating Multiple 2D Image Motions for Image Enhancement and for 3D Motion Analysis. Thesis for the degree of Doctor of Philosophy by Michal Irani. Submitted to the Scientific Council of the Hebrew University of Jerusalem 91904 Jerusalem, Israel, No date provided.

"Real–Time Decoding and Display of Structured Video", V. Michael Bove, Jr., Brett D. Granger, and John A. Watlington, Media Laboratory, Massachusetts Institute of Technology, 20 Ames Street, Cambridge MA 02139 USA, Proc. IEEE ICMCS '94, Boston MA, to be published May 1994.

"Image Sequence Coding at Very Low Bitrates: A Review", Haibo Li, Astrid Lundmark, and Robert Forcheimer, IEEE Transactions On Image Processing, vol. 3 No. 5. Sep. 1994.

"Video mosaic displays", Peter Burt, Michael Hansen and P. Anandan, David Sarnoff Research Center CN 5300, Princeton, NJ 08543–5300. SPIE vol. 2736, p 119–12. 1996.

"Pyramid–Based Texture Analysis/Synthesis", David J. Heeger, Stanford University, Stanford, CA 94305, James R. Bergen, SRI David Sarnoff Research Center, Princeton, NJ 08544, No date provided.

Motion Analysis for Image Enhancement: Resolution, Occlusion, and Transparency, Michal Irani and Shmuel Peleg, Institute of Computer Science, The Hebrew University of Jerusalem, 91904 Jerusalem, Israel. Received Nov. 30, 1992; accepted Aug. 23, 1993, Journal of Visual Communication and Image Representation vol. 4, Dec., pp. 324–335, 1993.

Copy of International Search Report dated Nov. 12, 1997, from corresponding international application.

Burt, Peter J. et al., "Enhanced Image Capture through Fusion" Issued Feb. 1993, IEEE. See pp. 173–182.

Burt, Peter J. "Moment Images, Polynomial Fit Filters, and the Problem of Surface Interpolation" issued Apr. 1988, IEEE. See pp.144–152.

Irani, Michal et al. "Mosaid Based Representations of Video Sequences and Their Applications" issued Aug. 1995, IEEE. See pp. 605–611.

Hansen, M. et al. "Real–Time Scene Stabilization and Mosaic Construction" issued 1994, IEEE. See pp. 54–62.

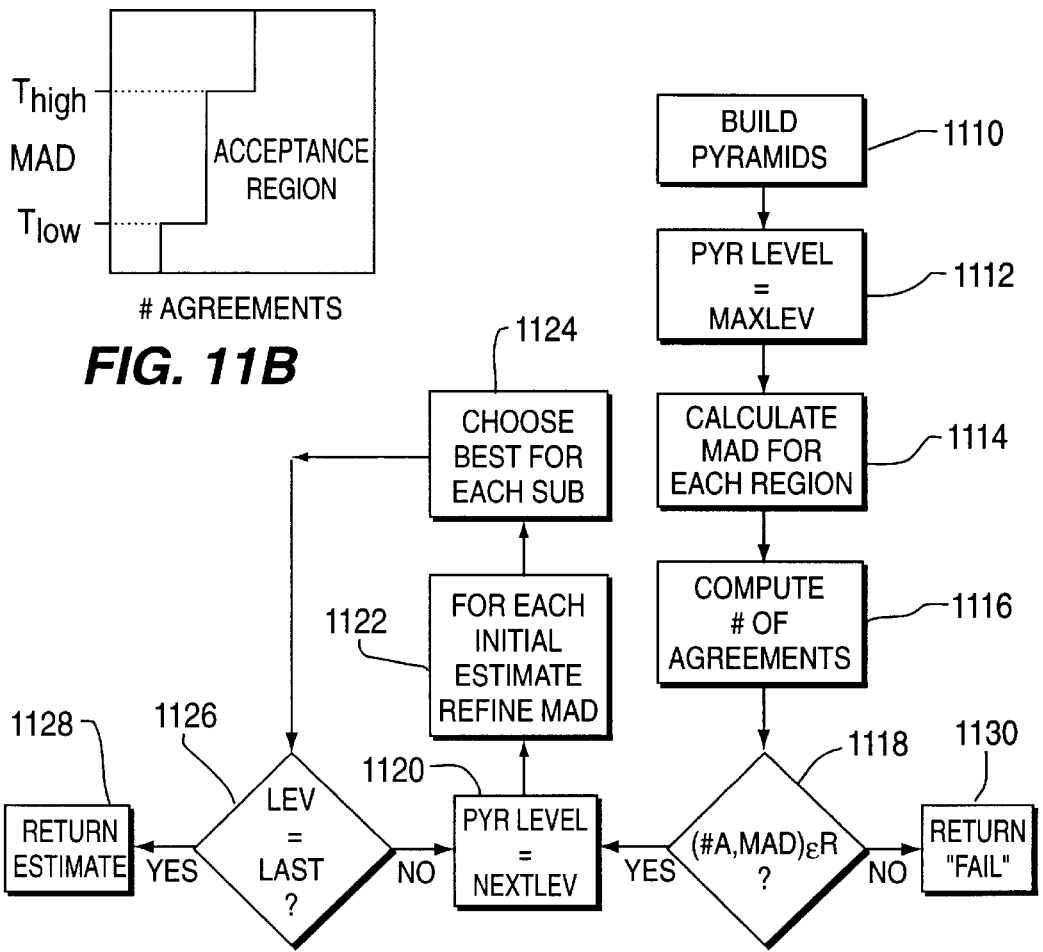
FIG. 11B
FIG. 11A
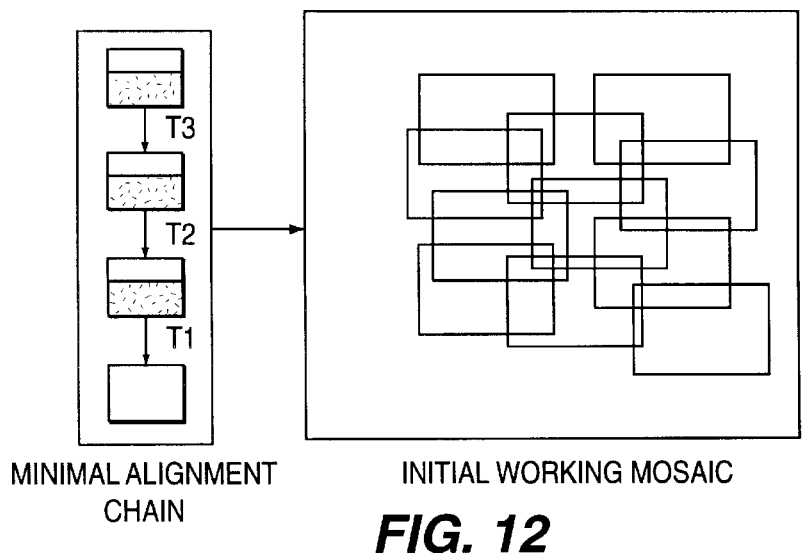
MINIMAL ALIGNMENT CHAIN
INITIAL WORKING MOSAIC
FIG. 12

METHOD AND APPARATUS FOR MOSAIC IMAGE CONSTRUCTION

This application is a non-provisional application based on Provisional Application Ser. No. 60/021,925, filed Jul. 17, 1996.

BACKGROUND OF THE INVENTION

The invention relates to a method and apparatus for constructing mosaic images from multiple source images.

Video and digital cameras provide relatively low resolution images, covering a limited field of view. Both the lower resolution and the limited field of view problems can be overcome by combining several images into an extended image mosaic.

Mosaics can be created from a set of source images by aligning the images together to compensate for the camera motion, and merging them to create an image which covers a much wider field of view than each individual image. The two major steps in the construction of a mosaic are image alignment, and the merging of the aligned images into a large, seamless, mosaic image.

Various methods and systems for image alignment for constructing mosaics currently exist. Mosaic images have been constructed from satellite and space probe images for many years. In these cases the appropriate parameters for aligning images are known from careful measurements of the camera viewing direction or are determined by manually designating corresponding points in overlapped image regions. A method that makes use of careful measurement of camera orientation is described, for example, in Plenoptic Modeling: An Image-Based Rendering System", L. McMillan and G. Bishop, SIGGRAPH 95. In this approach the images are taken from a camera the motion of which is a highly controlled, complete circle rotation about the optical center. The constructed mosaic is created by projecting the images into a cylindrical imaging plane, thus avoiding the distortions that may be associated with mosaicing a complete circle on a single planar image.

More generally, alignment is achieved through image processing techniques that automatically find image transformations (e.g., translation, rotation, scale) that bring patterns in overlapping images into precise alignment. Methods based on image processing are described in U.S. patent application Ser. No. 08/339,491 "Mosaic Based Image Processing System", filed on Nov. 14, 1994 and in U.S. patent application Ser. No. 08/493,632, "Method and System for Image Combination Using A Parallax-Based Technique" filed Jun. 22, 1995, each of which is incorporated herein by reference in its entirety.

Systems now exist that can construct mosaics from video in real time using these image processing methods. Such a system is described in "Video Mosaic Displays", P. Burt, M. Hansen, and P. Anandan, SPIE Volume 2736: Enhanced and Synthetic Vision 1996, pp 119–127, 1996. and in "Real-time scene stabilization and mosaic construction", M. Hansen, P. Anandan, K. Dana, G, van der Wal, and P. Burt, ARPA Image Understanding Workshop, November 1994, pp. 457–465.

Various image processing methods currently exist for merging source images into a seamless mosaic. The simplest methods digitally feather one image into another by computing a weighted average of the two images within the zone in which they overlap. This method can result in an appearance of double images if the source images are not precisely aligned over entire the overlap region or in a visible but blurred seam, if the two differ significantly in such characteristics as mean intensity, color, sharpness, or contrast. A more general method of merging images to avoid seams makes use of an image pyramid to merge the images at many different scales simultaneously. This method was first described in "A Multiresolution Spline With Applications to Image Mosaics", P. J. Burt and E. H. Adelson, ACM Transactions of graphics, Vol. 2, No. 4, October 1983, pp. 217–236 (Burt I).

It is also desirable for the merging step in mosaic construction also to fill any holes in the mosaic that are left by lack of any source images to cover some portion of the desired mosaic domain. A method of filling holes in the mosaic that uses the multiresolution, pyramid image processing framework has been described in Moment Images, polynomial fit filters, and the problem of surface interpolation, P. J. Burt, ICPR 1988, pp. 300–302.

Image merging methods used in mosaic construction may also provide image enhancement. For example, image "noise" can be reduced within overlap zones by simply averaging the source images. If some source images are of better quality than others, or show aspects of objects in the scene more clearly than others, then non-linear methods are may be used to choose the "best" information from each source image. Such as method is described in Enhanced image capture through fusion, P. J. Burt and R. Kolczynski, ICCV 1993, pp 242–246.

Multiple source images may be combined in ways that improve image resolution within the overlap regions. Such a methods is described in "Motion Analysis for Image Enhancement: Resolution, Occlusion, and Transparency", M. Irani and S. Peleg, Vision Communications and Image Representation Vol. 4, December 1993, pp. 324–335.

These existing methods for mosaic construction lack several capabilities that are provided by the present invention:

An effective image processing means for simultaneously aligning all source images to obtain a best overall alignment for use in the mosaic. Current methods align only pairs of images. In constructing a mosaic from a sequence of video frames, for example, each image is aligned to the previous image in the sequence. Small alignment errors can accumulate that result in poor alignment of overlapping image frames that occur at widely separated times in the sequence.

An effective image processing means for merging all source image to obtain a best overall mosaic. Current methods merge image only two at a time. A mosaic composed of many image is constructed by merging in one new image at a time. This method may not provide best overall quality, and may entail unnecessary computation.

An effective image processing means for merging source images that differ dramatically in exposure characteristics.

An effective image processing means for automatically selecting region of each source image to be included in the mosaic from the overlapped regions A system implementation that is practical for commercial and consumer applications.

SUMMARY OF THE INVENTION

The invention is a method of constructing an image mosaic comprising the steps of selecting source images, aligning the source images, selecting source image segments, enhancing the images, and merging the images to form the image mosaic.

The invention is also an apparatus for constructing an image mosaic comprising means for selecting source images, means for aligning the source images, means for selecting source image segments, means for enhancing the images, and means for merging the images to form the image mosaic.

BRIEF DESCRIPTION OF THE DRAWING

The teachings of the present invention can be readily understood by considering the following detailed description in conjunction with the accompanying drawings, in which:

FIG. 11A is a flow-chart diagram of a process which is suitable for use as the correlation process shown in FIG. 8.

FIG. 11B is a graph of an acceptance region which is useful for describing the operation of the correlation process shown in FIG. 11A.

FIG. 12 is a diagram of images which is useful for describing the back-end alignment process shown in FIG. 7.

To facilitate understanding, identical reference numerals have been used, where possible, to designate identical elements that are common to the figures.

DETAILED DESCRIPTION

The invention relates to apparatus and a method for constructing a mosaic image from multiple source images. The invention provides a practical method for obtaining high quality images, having a wide field of view, from relatively lower quality source images. This capability can have important uses in consumer and professional "photography," in which a video camera or digital camera is used to provide photographic quality prints. It can also be used to enhance the quality of displayed video.

Figure 1:
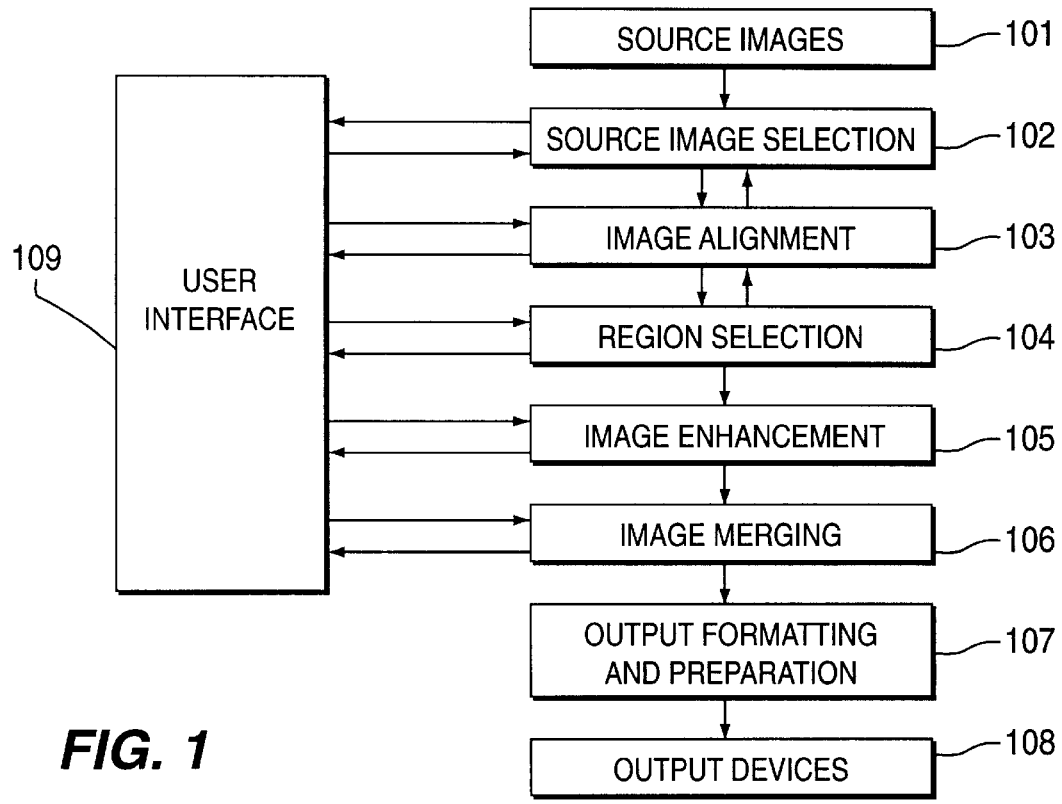
FIG. 1 is a block diagram the overall system.

A general process for forming a mosaic image is shown in FIG. 1. This comprises a image source 101, a sequence of processing steps 102 to 106, and a mosaic output means 108. There is also an optional means 109 for a human operator to view the results of the processing steps and interactively control selected steps.

Image Source 101

The mosaic construction process begins with a set of source images. These may include "live" images from various types of imaging sensors, such as video cameras, digital still cameras, and image scanners, images from various storage media, such as video tape (VCR), computer files, synthetically generated images, such as computer graphics, and processed images, such as previously constructed mosaics.

The mosaic construction process comprises five basic steps:

Step 1: Source Image Selection 102

A set of images to be combined into a mosaic is selected from the available source images. This may be done manually or automatically.

The selection process finds a set of good quality images that cover the intended domain and content of the mosaic.

When the mosaic is built from a sequence of video frames, this selection step may comprise indicating the first and last frames to be included in the mosaic. This selection indicates that all intermediate frames should be used. The start and stop frames may be selected through control of the video camera itself, as by starting or stopping systematic sweeping motions of the camera, motions that are then automatically detected by the system.

When a mosaic is to built from a collection of snapshots, it may be desirable for the user to interactively select each source image.

Source selection may also include cutting sub images out of larger images. For example, a user may cut out a picture of a person in one source image so that it may be merged into a new location in another image of the mosaic.

Step 2: Image Alignment 103

The selected source images are desirably aligned with one another so that each is in registration with corresponding portions of neighboring images. Alignment entails finding a geometrical transformation, or a "warping," which, after being applied to all of the selected images, brings them into a common coordinate system. The geometric transform is typically defined in terms of a set of parameters. These may be shift, rotate, dilate, projective, high order polynomial, or general flow (e.g., piece wise polynomial, with a different set of parameters at each sample point). Warping techniques are disclosed in U. S. Provisional Patent Application Ser. No. 60/015,577 filed Apr. 18, 1996 and entitled "Computationally Efficient Digital Image Warping" which is incorporated herein by reference in its entirety.

Alignment can be done interactively through the user interface 109, by having the user indicate corresponding points, then finding the transform parameters that bring these points into registration (or most nearly into registration according to some least error criterion), or by specifying the transformation parameters interactively (e.g., with a mouse or other pointing device).

Alignment can also be done automatically by various image processing methods that determine the warp parameters that provide a best match between neighboring images.

Alignment may combine manual and automatic steps. For example, an operator may bring the images into rough alignment manually, then invoke an automatic process to refine the warp parameters to provide precise alignment.

The alignment process may interact with the source image selection process 102. Alignment provides information on the degree of overlap and, in the case of video, on the velocity of camera motion. Images may be discarded if their overlap is too large, or new images may be added if the degree of overlap is too little. Images may be discarded if camera motion is too large, and thus likely to result in motion blur. Abrupt changes in camera motion may be used to signal the intended start and stop of video sequence used in mosaic construction.

This invention presents image alignment methods that take all frames into account simultaneously. Rather than the traditional alignment approaches that align two images by minimizing some error function between them, this disclosure proposes a method to align all images simultaneously, or to align any subset of images, by minimizing the error function which is the summation of all errors between any overlapping pair of images.

Step 3. Region Selection 104

Subregions of the overlapping aligned source images are selected for inclusion in the mosaic. The selection process effectively partitions the domain of the mosaic into subregions such that each subregion represents the portion of the mosaic taken from each source image. Selection may be done manually or automatically. Manual selection may be done interactively through the user interface 109, by drawing boundary lines on a display of neighboring overlapped images using a pointing device such as a mouse. Automatic selection finds the appropriate cut lines between neighboring images based on location (e.g., distance to the center of each source image) or quality (such as resolution or motion blur).

In a more general approach to selection, some overlapped portions of may be combined through averaging or pattern selective fusion.

Step 4. Image Enhancement 105

Individual images may be further processed prior to merging to improve their contrast or sharpness or to adjust these characteristics to be similar to the corresponding characteristics of their neighboring images. Enhancement is based on the intensity, color and filtering operations. Parameters of these operations may be determined manually or automatically.

Step 5. Merging 106

In this step, the selected source images are combined into a single mosaic. This is desirably done in a way that yields a result that looks like a single image, without seams or other merging artifacts. Simply copying pixels from the selected regions of each source into the mosaic generally does not yield satisfactory results. The boundary between neighboring segments that differ substantially in such characteristics as contrast, resolution, or color may appear as a visible seam in the mosaic.

Methods for combining images include feathering, multiresolution merging, averaging and fusion. Feathering is satisfactory if alignment is good and the neighboring images have similar properties. Multiresolution merging combines images at multiple resolution levels in a pyramid/wavelet image transform domain. This is effective to eliminate visible seams over a broad range of conditions. Averaging is appropriate as a means of improving signal to noise when the source images within the overlap region are of comparable quality and are in precise alignment. Image fusion is a generalization of the multiresolution merging method in which a selection is made among source images at each location, scale and orientation.

It is often the case that the source images do not cover the entire domain of the desired mosaic. There may be holes left within the mosaic that are not covered by any of the source images, or there may be regions around the merged source images that do not extend to the desired mosaic boundary. These regions may be left blank (e.g., assigned some uniform color, such as black) or they may be filled in a way that makes them inconspicuous. The latter effect may be achieved by multiresolution interpolation and extrapolation or by multiresolution merging with an image "patch" taken from a nearby piece of one of the source images or a patch that is generated artificially to appear similar to neighboring image regions.

In some cases it may be desirable to combine source images in such a way that an object from one image appears to be in front of a background provided by the other image. This effect is achieved by carefully cutting the first image along the intended foreground object boundary (such as a person's face) then inserting the resulting pixels into the other image. Edges may be blended to avoid aliasing (a jagged appearance due to image sampling) and images may be combined by more sophisticated methods that make shadows from one source appear to fall on background objects in the other. Boundaries may be identified manually or automatically, while blending is done automatically.

Step 6. Mosaic Formatting 107

Once the mosaic has been completed it may be further edited or processed to achieve a desired image format. For example, it may be warped to a new coordinate system, cropped, or enhanced through image processing techniques. These steps may be performed automatically or manually through the user interface 109.

Output Means 108

The final mosaic composite image may be presented on a display, printed, or stored in a computer file. The mosaic may also be made available as a source image 101, for use in the construction of new mosaics.

User Interface 109

A human operator may observe and control any or all of these processing steps through the user interface. This interface normally includes an image display device, and a pointing device, such as a mouse or a light pen. The operator may designate source images, image regions, and operations on these images through a visual user interface. The operator may also control parameters of the operations through slider bars or other real or virtual "knobs." He may manually assist with image alignment by designating corresponding points on different images or by pushing, stretching or rotating images on the screen using the virtual knobs.

In addition to standard user interface methods, such as a keyboard and a pointing device, this invention also presents a unique user interface for video input, allowing the user to interface with functions of the system by moving the video camera in prespecified motions, each such prespecified camera motion being interpreted to control some aspect of the mosaicing process.

It should be noted that the order of the steps in the mosaic construction process may be interchanged in some cases, and some steps may be skipped. For example, the enhancement step could be performed after the segment selection step, or before alignment step or even before image selection step, or even not be performed at all.

Image Selection

Figure 2:
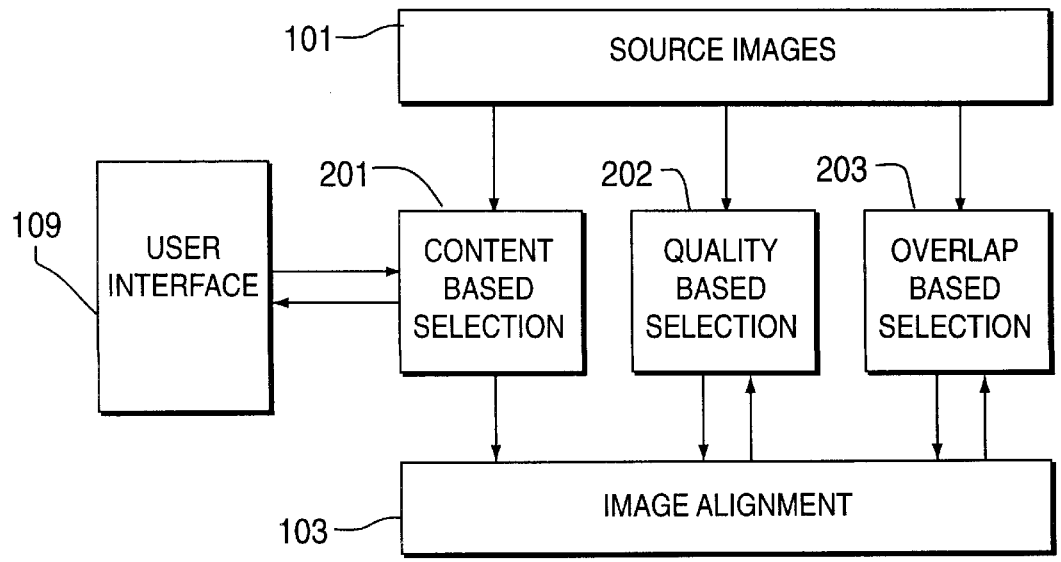
FIG. 2 is a flow diagram which illustrates the source image selection.

The source image selection step 102, may include additional steps such as those shown in FIG. 2. Source images may be selected on the basis of several factors, including content, quality, and degree of overlap. In general, the process of selecting source images is iterative, so that some images selected initially may be discarded later, and images not selected initially may be added later.

Content Based Selection 201

Selection based on image content is normally done manually. This may include the step of cutting pieces out of larger images so they may be inserted into new images. Such selection and cutting is normally done on a computer display using a pointing device such as a mouse.

Quality Based Selection 202

Selection based on image quality may be done manually or automatically. Automatic selection is normally used if there are a great many source images, as in mosaic construction from a video signal. This selection process may avoid images that are degraded, for example, due to motion blur or to poor exposure.

If the source images are a video sequence, then one motion blur may be detected by first measuring frame to frame image displacement. The degree of blur increases in proportion to frame displacement and in proportion to the exposure time for each frame as a fraction of the time between frames. Frame to frame displacement may be provided by the image alignment process 103. In addition, the exposure time may be known as part of the information provided with the source video. The image is noticeably degraded by blur when the product of exposure time and displacement represents a distance that is large compared to a pixel in the image.

An alternative method for detecting motion blur in a video sequence is to measure the degree to which the image appears to be blurred in one direction while it is sharp in others. A simple filter applied to the image may measure pattern orientation at each pixel position in the image (this may be a gradient operator or an oriented edge detector). If the resulting orientations when pooled over extended regions of the image or over the entire image are unusually clustered in one direction this may be taken as an indication of motion blur. The orientations may be judged to be unusually clustered by comparing the clustering for one image with the clustering for neighboring overlapped images.

A method for determining exposure quality may measure the energy within a set of spectral frequency bands of the source image. For a set of images of a given scene obtained with different exposures, the one with the largest energy may be taken as the one with the best exposure. The energy within a set of spectral bands may be computed by calculating the variance of the various levels of a Laplacian pyramid representation of that image. If the energy for several bands is low for one image compared to that of overlapping images, then the image may be rejected as likely having poor exposure.

Overlap Based Selection 203

Source image frames are preferably selected to provide an appropriate degree of overlap between neighboring images. This selection process depends, in part, on the application and computing resources available to the mosaic construction system. In general, the greater the overlap, the simpler it is to achieve good quality alignment and merging. On the other hand, the greater the overlap, the more source images are needed to construct a mosaic covering a given area, and hence the greater the cost in computing resources. The degree of overlap is provided to the selection system by the alignment process 103.

Image Alignment

The image alignment step desirably compensates for such factors as camera motion and lens distortion. Camera motion can introduce simple projective transformation between overlapping images, or can result in more complex parallax transformation that relate to the three dimensional distribution of objects in the scene. Alignment methods currently exist that can accommodate these factors. Here we define a method for aligning sets of images that are distributed in two dimensions over the mosaic image domain, so that each is aligned with neighbors above and below as well as to the left and to the right.

Existing methods for aligning pairs of images provide means for finding geometric transformations which, when applied to the two images, maximize a measure of image match or registration over their overlapped regions. Various types of match measure can be used, including cross correlation and least squared error.

The new method for simultaneously aligning three or more source images generalizes the procedure used for pairs of images by finding a geometric transformation which, when applied to each of the source images results in a global best match for all source images. The global best match is defined as an appropriate combination of match measures for the pairs of overlapping source images. In general, the task of finding a global best alignment is computationally difficult. The new method introduces practical means for finding the best global alignment.

Figure 3A:
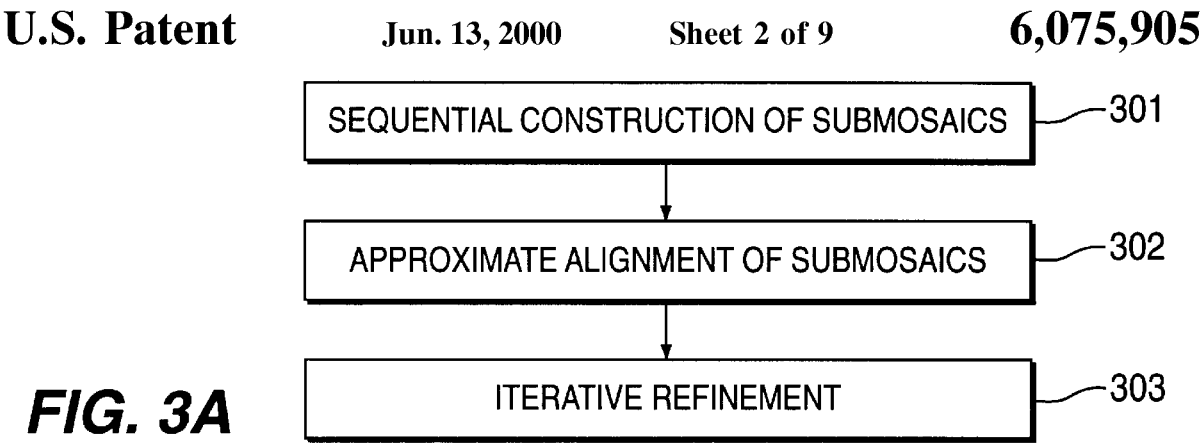
FIG. 3A is a flow-chart diagram which shows an exemplary image alignment method.

FIG. 3a shows the three stage process for finding global alignment.

Stage 1: Sequential Construction of Submosaics 301

The source images are first assembled into one or more submosaics in a sequential process. This process begins with the selection of one or more source images to serve as seeds. Then a mosaic is grown from each seed by adding other source images one at a time. Each new image is aligned with the existing mosaic in pairs, then is incorporated in the mosaic. Alternatively, it is aligned with one of the images that is already in the mosaic, and the parameters of that alignment as well as the alignment of the overlapped image are combined mathematically to obtain parameters for aligning the image to mosaic alignment.

A submosaic is typically constructed from a video sequence by aligning each new video frame to the preceding frame. New submosaics may be initiated whenever there is a significant change in the direction of camera motion.

This processing stage does not provide an overall best alignment of the source images, but only an approximate alignment of subsets of images based on a subset of the possible alignment of the images in pairs.

Stage 2: Approximate Alignment of Submosaics 302

The submosaics are aligned roughly to one another. In practical systems this step may be done manually or may be based on rough camera orientation parameters that are known from camera orientation sensors, such as gyroscopes. The alignment may also be based on alignment of pairs of submosaics or on selected pairs of frames within neighboring submosaics using the known image processing alignment methods. Precise alignment between neighboring submosaics is often not possible. Alignment of pairs of submosaics in Stage 1 can result in the accumulation of small alignment errors over an extended submosaic. As a result, each submosaic may be somewhat distorted relative to neighboring submosaics.

Stage 3: Iterative Refinement 303

Once a rough overall alignment of all the source images has been generated that alignment is refined through an iterative adjustment process. The adjustment may be performed hierarchically, for example, within a multiresolution pyramid image processing framework. Using this method, adjustments are first computed for low resolution representations of the submosaics. This improves the large scale alignment of the overall mosaic. Then the submosaics are decomposed into smaller submosaics, and the adjustments are repeated for these, typically at a higher image resolution. This improves overall mosaic alignment at an intermediate scale. The small submosaics are again decomposed into smaller submosaics, and the alignment of these is adjusted. These divide and align steps are repeated until a desired precision and image resolution is achieved, possibly at the level of individual source image. The adjusted alignments of individual frames, and small submosaics may be used to reconstruct larger submosaics, Stage 2, in a fine-coarse procedure. Fine-coarse and coarse-fine passes may be repeated until a desired overall alignment is attained. The inventors have determined that for most applications, a single pass will suffice.

Method for Adjusting Alignment

The method for adjusting alignments in stage 3 considers the global alignment of a given source image (or sub mosaic) with all of its neighboring overlapped images (or submosaics). A match measure is computed that combines measures over all the pairs of overlapped neighboring images (submosaics). Then geometric transformation parameters are found that optimize this combined match measure. Global alignment may performed for one image (submosaic) at a time, or simultaneously for groups of images (submosaics). These techniques are described below as Methods 1 and 2, respectively. In either case the adjustments are cycled systematically over all images (submosaics) that make up the overall mosaic. These steps may be defined more explicitly as follows:

Given a sequence of N source images (or submosaics) $\{I_k\}$, $0 \leq k < N-1$, compute a global alignment error by adding up all alignment errors from all image pairs which overlap. We define by "alignment" a set of transformations $\{T_k\}$ such that each transformation $T_k$ warps the image $I_k$ into the common coordinate framework of the mosaic. If $W_k$ is the image $I_k$ warped by the transformation $T_k$ then the overlap is computed between every pair of aligned images, $W_m$ and $W_n$. There are $N^2$ such image pairs. If there is an overlap, then an alignment error $E_{mn}$ can be calculated. $E_{mn}$ can be, for example, the sum of squared difference of image intensities in the overlapping area, cross correlation, or any other measure of the quality of image alignment. In cases where the images have no overlap, $E_{mn}$ is zero. The global alignment error E is then the sum over all $N^2$ image pairs of $E_{mn}$. To avoid the solution where there is no overlap between any image pair, standard methods are used. These include the consideration of only those alignments that have at least some pre-specified area of overlap, or some prespecified number of overlapping pairs. The measure of the match of each image pair may be normalized by dividing the measure by the area of overlap.

The mosaic coordinate system is not addressed in this invention. It can be the coordinate system of one of the input images, or another coordinate system computed by any other way, or manually selected by the user.

As used in this application, a global alignment is a set of transformations $\{T_k\}$ which minimize the global alignment error E. This set of transformations can be found using a minimization method to minimize the global alignment error E.

Figure 3B:
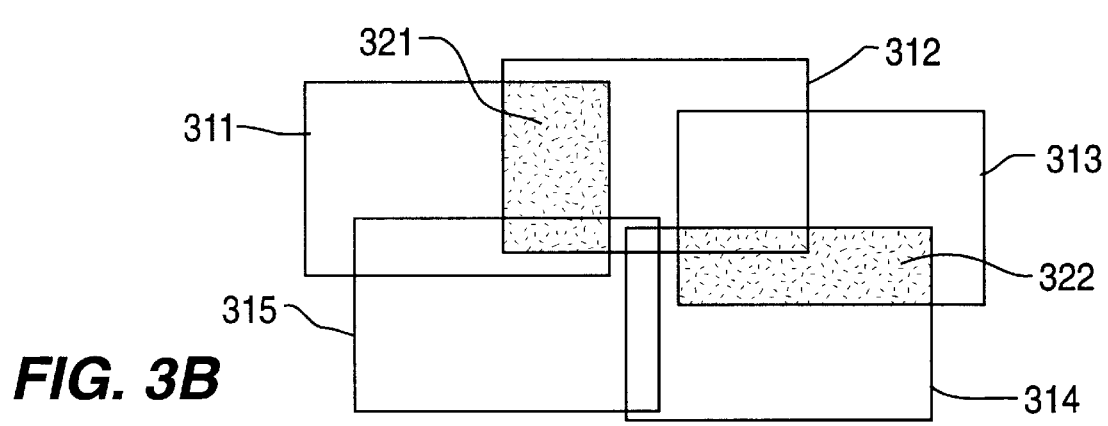
FIG. 3B is an image diagram which is useful for describing the alignment process shown in FIG. 3A.

Consider, for example a proposed global image alignment in FIG. 3. The error function for this alignment is computed from all pairs of images that share an overlapping region. The shaded region 321 is, for example, the overlapping region between Frame 311 and Frame 312. Region 322 is the overlap between frames 313 and 314.

Even though the exemplary method is defined using all image pairs, a smaller subset of image pairs may be used to increase speed of computation, or in situations where the relevant image pairs can be determined in advance by some other process. For example, an alternative to computing the error function for all image pairs that share an overlapping region is to use only adjacent image pairs. One possible way to define the adjacency between image pairs is to use the "Voronoi Diagram" described in "Voronoi Diagrams, a Survey of Fundamental Geometric Data Structures", F. Aurenhammer, (Aurenhammer) Computing Surveys, Vol 23, 1991, pp 345–405. Using the center of each frame as a nucleus for a Voronoi cell, we define as "adjacent" those frames having Voronoi cells which share a common vertex.

Simultaneous minimization of the alignment error for all overlapping regions, or even for the overlapping regions of only adjacent image pairs, may be computationally expensive. The inventors have defined several simplified implementations which reduce the computational complexity.

Method 1—Analytic optimization with coarse-fine refinement.

Match measures are computed first between pairs of overlapping frames. The match measures are represented as surfaces for a small range of parameter values centered on the position of the current expected optimum match. These surfaces can be described explicitly by storing their alignment measure, or stored implicitly as a parametric surface. An estimate of the overall best alignment can then be determined analytically based on the collection of match surfaces for pairs of overlapping frames. The source images are warped to the estimated best match position, and the match surfaces are again computed. The process may be iterated several times to successively improve the overall alignment. These steps may be further implemented in coarse-fine fashion, so that initial alignment is based on low resolution representations of each source, and final refinements are based on high resolution representation of each source.

Iteration in this method is desirable because the pairwise match measure surfaces can be computed for simple transformations while the global alignment is estimated using more complex transformations. For example, match measure surfaces may be computed for translations only, while the global alignment of an image relative to multiple neighbors may include affine transformations.

Method 2—Local alignment refinement.

Once the set of source images are in rough alignment, the alignment parameters of each image may be adjusted in turn to optimize its match to its overlapping neighbors. This is repeated for each source image in turn, then iterated several times. Further, the process may be implemented as coarse-fine refinement. Implementation may be either sequential, with the transformation of one image adjusted in each iteration, or in parallel, with multiple overlapping source images being concurrently aligned with their respective neighborhoods.

Region Selection

Each point in the final mosaic may be covered by several input images. One of these is desirably selected to define the pixel value at that point in the mosaic. Let $SR_k$ be the subregion of the (transformed) image $W_k$ to be included in the mosaic. There are several methods that may be used to select the SRs.

Method 1: Proximity

The simplest method to select the SRs is by proximity to the center of the images. Let a mosaic pixel p be covered by several images $W_k$. The proximity criterion will select for the value of pixel p to be taken from that image $W_k$ which has a center that is closest to p. This tessellation is known as a "Voronoi tessellation", and the resulting SRs are convex regions. In this instance, the boundary between two adjacent images is the bisector of the line segment connecting the two image centers. Voronoi tessellation is described in the above-identified article by Aurenhammer.

For example, when the input images have only horizontal translations, each input image contributes only an upright rectangular strip around its center to the final mosaic.

Figure 4:
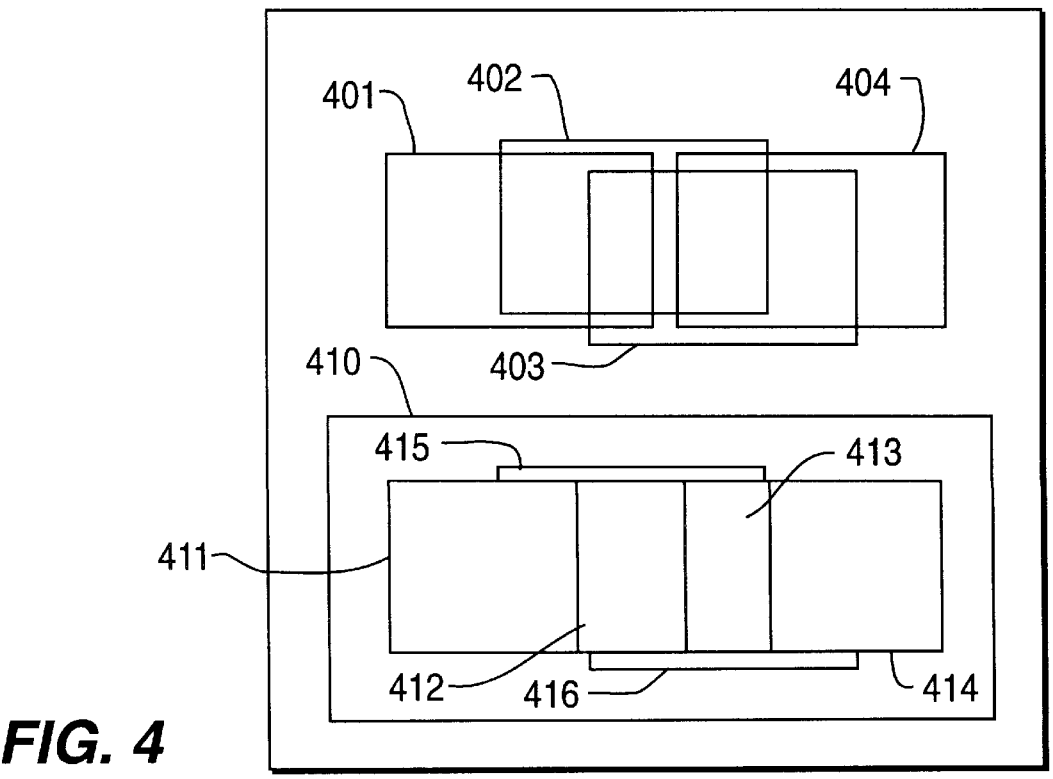
FIG. 4 is an image diagram which depicts the region selection.
Figure 5:
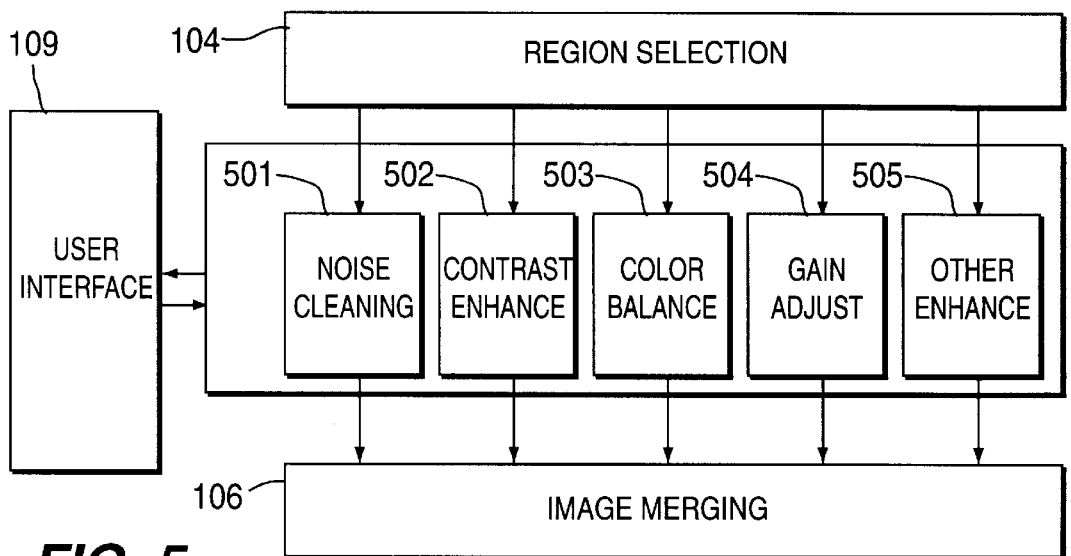
FIG. 5 is a flow diagram which shows an image enhancement process.

An example for region selection is shown in FIG. 4. Frames 401, 402, 403, and 404 are shown after alignment. In the constructed mosaic 410 region 411 is taken from Frame 401, region 412 is taken from Frame 402, region 413 is taken from Frame 403, region 414 is taken from Frame 404, region 415 is taken from Frame 402, and region 416 is taken from Frame 403.

Method 2: Image Quality

The SRs may be selected on the basis of image quality. The value assigned to pixel p of the mosaic is taken from that source image which is judged to have the best image quality at that point. Image quality ratings may be based on such criteria as contrast or motion blur. As an example, the gradient magnitude may be used. This is higher when the image is sharper. Such a selection criteria is described in U.S. Pat. No. 5,325,449 entitled "Method for Fusing Images and Apparatus Therefor", issued Jun. 28, 1994 which is incorporated herein by reference for its tracking on image gradient calculations. Using all overlapping images covering a specific region, that image having highest quality is selected to represent the region.

Method 3: Alignment

The degree of alignment is often not uniform over the overlap region between two images. The cut line defining the boundary between the SRs for these images is desirably positioned to pass through the overlap region along a locus of points where alignment is particularly good. This minimizes misalignment along mosaic seams, where it would be most noticeable in the final mosaic. To find this locus of points, a residual misalignment vector is estimated at each pixel of the overlap region. A cut line is then found that partitions the region of overlap such that the sum of residual misalignment along this line is minimal. The Voronoi type of tessellation is an approximation to this criterion when the better alignment is near the center of images, while alignment degrades towards image periphery.

Image Enhancement

Individual images may be further processed prior to merging to improve their contrast or sharpness or to adjust these characteristics to be similar to the corresponding characteristics of their neighboring images.

Enhancement is based on the intensity, color and filtering operations. Parameters of these operations may be determined manually or automatically.

Merging

In practice it may not be desirable to assemble source images into a mosaic simply by copying the pixel values from their respective SRs to the mosaic. This may result in visible seams. Rather, it is desirable to blend the neighboring image regions together. A particularly effective means for blending first decomposes the source images into a set of two or more band pass spatial frequency components then merges the images in each band separately over a transition zone that is proportional to the mean wavelengths in that band. A known implementation of this method makes use of the Laplacian pyramid image transform to decompose images into their bandpass components.

For an explanation of the use of Laplacian pyramids in image merging see Burt I referred above. This publications also describes how to construct a Laplacian pyramid from an image, and how to construct an image from a Laplacian pyramid.

Briefly, two Laplacian pyramids are created, both based on an image the size of which is the size of the final mosaic M. One pyramid, M, is for the final mosaic image M, and the other pyramid, L, is for the current image. Each source image $I_k$ is first transformed (warped) by $T_k$ into image $W_k$ that is aligned with the mosaic. The warped image is then expanded to cover the entire domain of the mosaic by padding with pixels of a specified value or by a more general extrapolation method, described below. The Laplacian pyramid L is then computed for $W_k$. Values from the pyramid L are copied into their appropriate locations in the pyramid M, based on the location of the segment $SR_k$ that will come from the $W_k$. After this is done for each image, all elements in the pyramid M that correspond to regions covered by input frame have assigned values. The final mosaic M is than constructed from the Laplacian pyramid M, giving a seamless mosaic.

In one exemplary embodiment of the present invention the multiresolution merging process is performed not on the source images themselves but on a gray scale transformed version of the image. In order to merge images that differ significantly in exposure characteristics, the images are first transformed on a pixel by pixel basis by an invertible compressive scalar transformation, such as a log arithmetic transformation. Multiresolution merging is performed on the scalar transformed source images, then the final mosaic is obtained by inverting the scalar transform for the image obtained through merging.

An example of when this procedure may be beneficial is the commonly occurring example of merging images having different gains. Such images may be taken by a video camera having automatic gain control, or by still camera which applied a different gain for each image. The gain transformation can be approximated by a multiplication of the image intensities. In order to make a smooth gain transformation, better blending is obtained by applying the logarithmic transformation to the images before merging. The transformed images are merged, and the exponent (or antilog) of the blended transformed images gives the final result.

In color images, the above transformation may be applied only to the intensity component, or to each color signal component separately, depending on the imaging circumstances.

Region Selection in Pyramid

An exemplary implementation of the multiresolution merging process is presented in Burt I. This implementation uses a Laplacian pyramid to decompose each source image into a regular set of bandpass components. When two images are merged a weighting function for one of these images, say $W_1$, can be defined by constructing a Gaussian pyramid of a mask image that is defined to be 1 within the region $SR_1$ and 0 outside this region. Such a Gaussian pyramid provides a weight that is multiplied by each corresponding sample of the Laplacian pyramid of $W_1$. This weighting follows the proportional blending rule. If there are just two source images, $W_1$ and $W_2$, and the regions $SR_1$ and $SR_2$ represent complementary portions of the mosaic domain, then multiresolution merging follows the simple procedure: (1) Build Laplacian pyramids for $W_1$ and $W_2$. (2) Build Gaussian pyramids for masks that are within regions $SR_1$ and $SR_2$. (3) Multiply the Laplacian and Gaussians components for each source on a sample by sample basis. (4) Add the resulting product pyramids. (5) Perform the inverse Laplacian pyramid transform to recover the desired merged images.

In this invention disclosure we introduce two refinements of the methods defined by Burt and Adelson.

1. Weighted Summation with Normalization

If more than two images are used and their respective segments, $SR_k$, exactly cover the mosaic image domain, without holes or overlap, then the above procedure can be generalized to the merging of any number of images. The total weighting provided by the Gaussian pyramids for the subregions sums exactly to one at each sample position. However, if the $SR_k$ do not exactly cover the mosaic image domain, then the sum of the weights at each sample position may sum to one. In this case the images may be combined as in steps 1 to 4 above. Two new steps are now introduced: (4b) the Gaussian pyramids are summed on a sample by sample basis, and (4c) each value in the combined Laplacian pyramid is divided by the corresponding value in the combined Gaussian pyramid. This has the effect of normalizing the Laplacian values. The final mosaic is recovered through an inverse transform, as in Step 5.

2. Simplified Selection

A simplified method for constructing the combined Laplacian may also be used in which the weighting functions for proportional blending are only implicit. In this procedure the Laplacian pyramids for each source image are constructed as before. (Step 1). No Gaussian pyramids are constructed. (No steps 2 and 3.) The Laplacian for the mosaic is then constructed by copying all samples from all levels of the Laplacian pyramid for each source image $W_k$ that falls within the domain of the corresponding segment $SR_k$ to the Laplacian for the mosaic. (Step 4). The mosaic is obtained through the inverse transform, as before. (Step 5). This simplified method can be used when the source image segments, $SR_k$, exactly cover the mosaic domain, so that no normalization is needed. The inverse Laplacian pyramid transform has the effect of blurring the selected bandpass components to provide the proportional blending used by the multiresolution merging method. It may be noted that the spatial position of (i,j) at level one of a Laplacian pyramid constructed with an odd width generating kernel are at Cartesian coordinates $x=i2^1$ and $y=j2^1$. If these coordinates fall within $SR_k$ for a sample within the Laplacian pyramid for image $W_k$ then that sample value is copied to the Laplacian for the mosaic.

Figure 6:
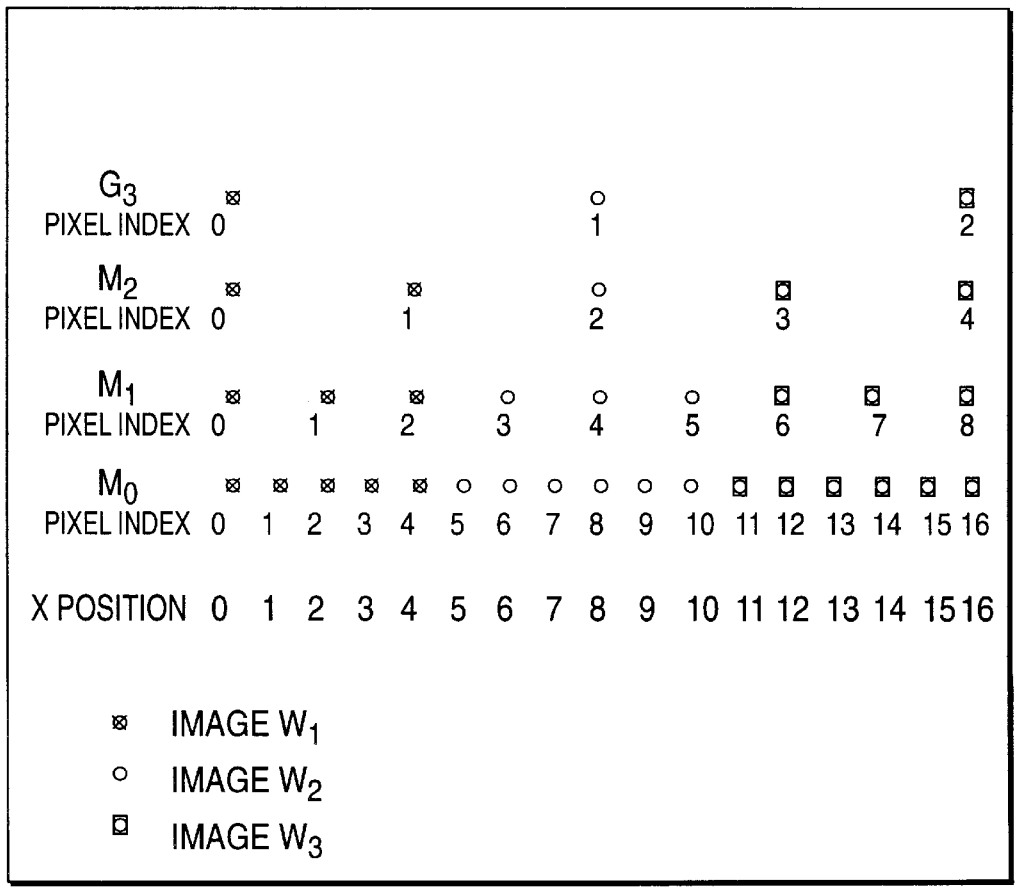
FIG. 6 is a data structure diagram which illustrates a pyramid construction for image merging.

This simplified method is illustrated in FIG. 6. A one-dimensional case is shown in FIG. 6 for clarity of presentation, but generalization to the two dimensional case of images is straight forward.

Given three aligned images $W_1$, $W_2$, and $W_3$, the final mosaic is to be constructed from image $W_1$ in pixels 0–4, from image $W_2$ in pixels 5–10, and from image $W_3$ in pixels 11–16.

The values of $M_0(x)$ are assigned as follows: for pixels x=0 . . . 4, they are taken from the same level at the Laplacian pyramid generated for image $W_1$, $L_0(x)$, also for x=0 . . . 4. For pixels x=5 . . . 10, they are taken from the Laplacian pyramid generated for image $W_2$, $L_0(x)$, for x=5 . . . 10. For pixels x=11 . . . 16, they are taken from the Laplacian pyramid generated for image $W_3$, $L_0(x)$, for x=11 . . . 16.

For the rest of the pyramid, values of $M_i(x)$ are taken from the corresponding i-th level of the Laplacian pyramid for the image that contributes to location $_2{}^i x$ in the mosaic image M. Therefore, for $M_1(x)$, values for x=0 . . . 2 are taken from the Laplacian pyramid for image $W_1$, values for x=3 . . . 5 are taken from the Laplacian pyramid for image $W_2$, and values for x=6 . . . 8 are taken from the Laplacian pyramid for image $W_3$.

In this example, as in most practical cases, the Laplacian pyramid is not constructed until the top level is only a single pixel. In such cases, the top level of the pyramid is taken from the same level of the Gaussian pyramid of the image. $G_3$ is, therefore, composed of values taken from the Gaussian pyramid of the corresponding images.

Handling Image Boundaries

The individual source images W are defined on the same coordinate system and sample grid as the final mosaic. However, they generally are smaller than the mosaic. When a Laplacian pyramid is constructed for each image $W_k$ it is expedient to extrapolate this image, at least implicitly, to cover an extended image domain, up to the entire domain of the final mosaic. This extension is desirable to ensure that all the samples from the pyramid that contribute to the final mosaic (i.e., those with non-zero weights, Method 1, or that fall within the domain of $SR_k$, Method 2) have well defined values.

This extrapolation can be done in the original image or can be done as the pyramid is constructed. If done in the original image domain the, extrapolation desirably ensures that no point within the segment $SR_k$ is within a distance d of the boundary of the image where $d=D\ 2^M$, where M is the top level of the Laplacian pyramid used in merging and D is a small integer that is related to the size of the filter kernel used in pyramid construction (e.g. D=one-half of the linear filter kernel size for a symmetric filter having an even number of taps). A simple method of image domain extrapolation is to replicate the values of edge pixels. Another method that may be used in mosaic construction is to copy corresponding pixels from other source images. If these other images differ significantly from $W_k$ in exposure characteristics then they may be gray scale transformed to have similar characteristics to $W_k$. Extrapolation may be done during pyramid construction by such methods as described in "Moment Images, Polynomial Fit Filters, and The Problem of Surface Interpolation," P. J. Burt, ICPR 1988, pp. 300–302.

Color Images

There are several approached to handle color images. A color image can be represented as a three-dimensional image, in any of the accepted color standards (RGB, YUV, Lab, etc.).

Image alignment may be done in one component only (Say the intensity Y component), where a regular monochrome alignment technique can be used. Alternatively, alignment may minimize error functions which involve more than one component. Image merging can be done for a single component as well as, for example, for the intensity Y component, while the other two component signals are taken directly from the merged images. Alternatively, image merging may be done for each component separately (e. g. The R, G, and B components, or the L, a, and b components), each component being treated as a monochrome image.

For a monochrome mosaic, the blurring of the inter-image seams by splining causes human observers to be unable to discern that it is composed of sub-images. Even rudimentary lightness balancing is often not needed if splining has been done. The fusion of sub-images occurs because, although human vision is quite sensitive to luminance differences at high spatial frequencies (e.g., at seams), it is less sensitive at low spatial frequencies (e.g., across sub-images). On the other hand, chrominance differences are more effectively perceived at low spatial frequencies. Therefore, even when the seam is blurred between two sub-images in a mosaic, a color imbalance between the images is discernible unless care is taken to color-correct all of the sub-images after they are registered and before they are splined together.

A method is presented here for achieving color correction between sub-images in a mosaic, based on comparisons between the colors in the overlap regions between the images. For two overlapping images, the method consists in performing a least-square fit over the image-overlap region to determine the color-space affine transformation (among the R. G, B component signals) that brings the second image closest to the first. The resulting affine transformation is then applied to the entirety of the second image. Extending the objective function to more than two overlapping images is done simply by ascribing affine transformation to all but one of the images (these transformations being with respect to the untransformed, or reference image), and then by adding the squared RGB color differences over all the pixels in all the overlap regions.

The physics of image creation provides strong motivation for affine color correction. Under fairly general and natural circumstances, an affine transformation in color space compensates for (a) color-space differences between the two images due to different acquisition systems; (b) differences in illumination spectrum due to different times of acquisition; and (c) haze and other translucent media in one image that do not appear in the other. This is described in a paper by M. H. Brill, published in MIT RLE Progress Reports No. 122 (1980), 214–221.

The implementation of the algorithm in the context of is outlined below:

1. Apply the above image-registration algorithm only to the luminance images, identify and index the overlap regions, and apply the luminance-image derived transformation to all three component color signals.
2. Identify a reference image $G_1$, and do a simultaneous least-square adjustment over all the overlap regions to determine the best color-space affine transformations between each nonreference image $G_k$ and the reference image. The objective function is the sum over all pixels x in all overlap regions (e.g., for sub-images i and k) of $(A_k G_k(x)+b_k-A_i G_i(x)-b_i)^2$, where $G_K(x)$ is the column vector of (R, G, B) at pixel location x in image k, and $G_i(x)$ is the column vector of (R,G,B) at pixel location x in image i. $A_k$ and $A_i$ are 3×3 matrices, and $b_i$ and $b_k$ are column 3-vectors. For the reference image 1, $A_1=I$ and $b_1=0$. Solving for the affine parameters comprising matrices A and vectors b will involve solving 12N−12 simultaneous linear equations in the same number of unknowns, where N is the number of sub-images in the mosaic.
3. Perform image splining on R, G, and B color signal components separately using the above algorithm.
4. Make sure the image mosaic is within a realizable digital-value range. Do this by adding a constant to each component signal (e.g. R, G & B) in the image, that constant being chosen to remove all negative pixel values. Then scale each component by a constant sufficient to lower the maximum value over the image to the maximum attainable digital value.

If the images are imperfectly registered relative to the size of represented objects, local pixel averages can replace the individual pixel values in the objective function of Step 2 above.

If the registration is poor at the pixel level but image overlap regions can still be identified, step 2 may be modified to optimize the affine transformations to match the color signals and inter-component correlation matrices within the respective overlap regions. The quadratic transformation property of correlation matrices is described for color recognition in a paper by G. Healey and D. Slater, published in *J. Opt. Soc. Am. A,* 11 (1994), 3003–3010. The new objective function is the sum over all overlap regions (e.g., between sub-images i and k) of a weighted sum of $(A_k C_k A_k^T - A_i C_i A_i^T)^2$ and $(A_k M_k + b_k - A_i m_i - b_i)^2$ Note: To specify $A_k$ completely, it is desirable to add an analogous term comparing third moments, which transform as third-rank tensors. Here $m_k$ and $C_k$ are the 3-vector signal mean and the intersignal 3×3 correlation matrix for pixels within the overlap region of images i and k, and $m_i$ and $C_i$ are similarly defined (still within the i, k overlap). The resulting least-square problem leads to a nonlinear set of equations in the affine parameters. If the computation needed to solve these equations is too great, a fallback position is to replace the full 3×3 matrix in the affine transformation by a diagonal matrix. In that event, the least-square equations become linear in the squares of the matrix elements, and can be readily solved. In the special case of two overlapping images, each color component of image G2 is corrected to an image G2' which has a mean and variance that match the mean and variance of the image G1, by the transformation.

$$G2'=a\ G2+b.$$

Here a=sigma1/sigma2, b=mean1−(sigma1/sigma2)mean2, mean1 and sigma1 are the mean and standard deviation of the pixel values in the color signal component of concern for image G1 (the reference image), and mean2 and sigma2 are similarly defined for image G2 (the inspection image). In each application, it should be determined whether this step gives sufficient color correction before the more elaborate color adjustments are tried.

The basis for this alternative method of handling color images is the use of overlapping image areas to effect affine color correction among the sub-images in a mosaic. Although affine color correction has been discussed for some time in color reproduction and in machine vision, it has not enjoyed much success because discovering the correct affine transformation has typically required either very restrictive spectral assumptions or the definition of reference colors of correctly segmented areas in the picture. The presence of an overlap between the inspection and the reference image obviates these problems and hence allows the affine correction to be directly calculated. The approach can be extended transitively to all other images that are connected to the reference image by a series of image overlaps.

Interactive View of Alignment

After alignment, the images are (optionally) presented to the user. The mosaic presentation is done similar to the presentation in FIG. 3B, where all images are transformed to the common coordinate system. The viewing is done so that the position of each image within the mosaic is presented, as well as the original image. One such possible interaction is by moving the cursor or other pointing device across the mosaic. The video frame which contributes to the region in the mosaic that includes the cursor is displayed in one part of the screen, while the contributing region as well as the image boundary is displayed on the mosaic. This interaction allows the operator to examine the quality of the images and their alignment. The operator may, for example, delete frames that have poor quality (e.g. noise of blur), while ensuring that all images in the mosaic are covered by at least one input image.

One of the effects of the above interaction is to give the user a new way to view the video. By controlling the direction and speed in which the pointing device moves on the mosaic, the user can now control the display of the video. In particular, the user can control the forward/backward video display, as well as its speed Additional user interaction may be desirable to correct poor alignment. The automatic alignment may fail, for example, when image overlap is small, when images have excessive amounts of noise or when the images have only a few distinguishing features. In such cases the user may manually align the images, for example, by dragging frames with a mouse, or by clicking on common features that appear in misaligned images. The system can compute the frame alignment transformation from this manipulation. Such transformations can serve as an initial guess for further automatic alignment, which may now give better results because of an improved initial guess.

Device Control Based on Video Motion Analysis

The customary method to activate a data processing device or a computer program is by pressing the "on" button or its equivalent, followed by pushing the "off" button or its equivalent. In some cases, however, the operation of a device is controlled by the information it is processing. An example is the "voice activated" answering machines, which turn off the recording of incoming messages when no voice is signals are detected on the telephone line.

The present invention includes the use of a video motion analysis module in order to control devices and computer programs the operation of which is relevant only when the camera is moving, or when a moving object is visible in the field of view. Video motion analysis is well known, as is described in the book Digital Video Processing by M. Tekalp. The motion of the camera, or the imaged object, are analyzed, and particular motion patterns are interpreted as instructions from the device to the computer program.

An example application for motion control is in the creation of panoramic images from second frames of a video signal or from an image sequence (VideoBrush). The control of this device can be as follows: image mosaicing takes place only between two periods where the camera is stationary. In this example, after image mosaicing is enabled, the process waits until the camera is stationary (frame to frame motion is less than a given threshold), starts mosaicing when the camera motion exceeds a certain threshold, and stops mosaicing when the camera is stationary again. In addition to the camera motion which controls the beginning and end of the mosaic process, the direction of the camera motion may be used to control the internal details of the mosaicing process itself.

Exemplary Embodiment

An exemplary embodiment of the invention is described with reference to FIGS. 7 through 15. This exemplary embodiment is a system for real-time capture of a high resolution digital image stream 714 using a hand held low resolution digital image source (such as a video camera 710 and digitizer 712 or digital video camera), and software running on an unmodified personal computer (not shown). This process is accomplished by combining a highly efficient "front-end" image alignment process 716, that processes images as quickly as they are received to produce an initial mosaic image 718, and a highly accurate "back-end" image alignment process 720 and merging process 722 that provide a seamless mosaic image 724.

In order for the overall system to perform its function the front-end alignment process is desirably capable of performing continuous frame-to-frame image alignment during the image capture operation. The end result of this process is the initial mosaic data structure 718 consisting of a list of overlapping source image frames, each source image having associated motion parameters that relate the frame to other frames adjacent to it in the sequence. If any one of these sets of motion parameters is missing or incorrect, it may be difficult to assemble the mosaic because the relationship of one part of the image sequence to the rest of the image sequence may be undefined. Thus, in order to provide reliable system function, the front-end alignment process 716 desirably 1) functions in real-time and 2) returns a correct alignment result for all of the frames with high probability.

The goal of the exemplary front-end alignment process 716 is to produce a minimal alignment chain (MAC) that defines the initial mosaic by relating the entire input image stream. This MAC consists of a sequence of input images together with alignment parameters that serially align each image only to the previous image in the chain. It is minimal in the sense that in contains as few of the input images as possible for the alignment process to proceed. This minimal property is desirable because it reduces the amount of processing and storage required in back-end alignment process 720 and the blending process 722.

Figure 8:
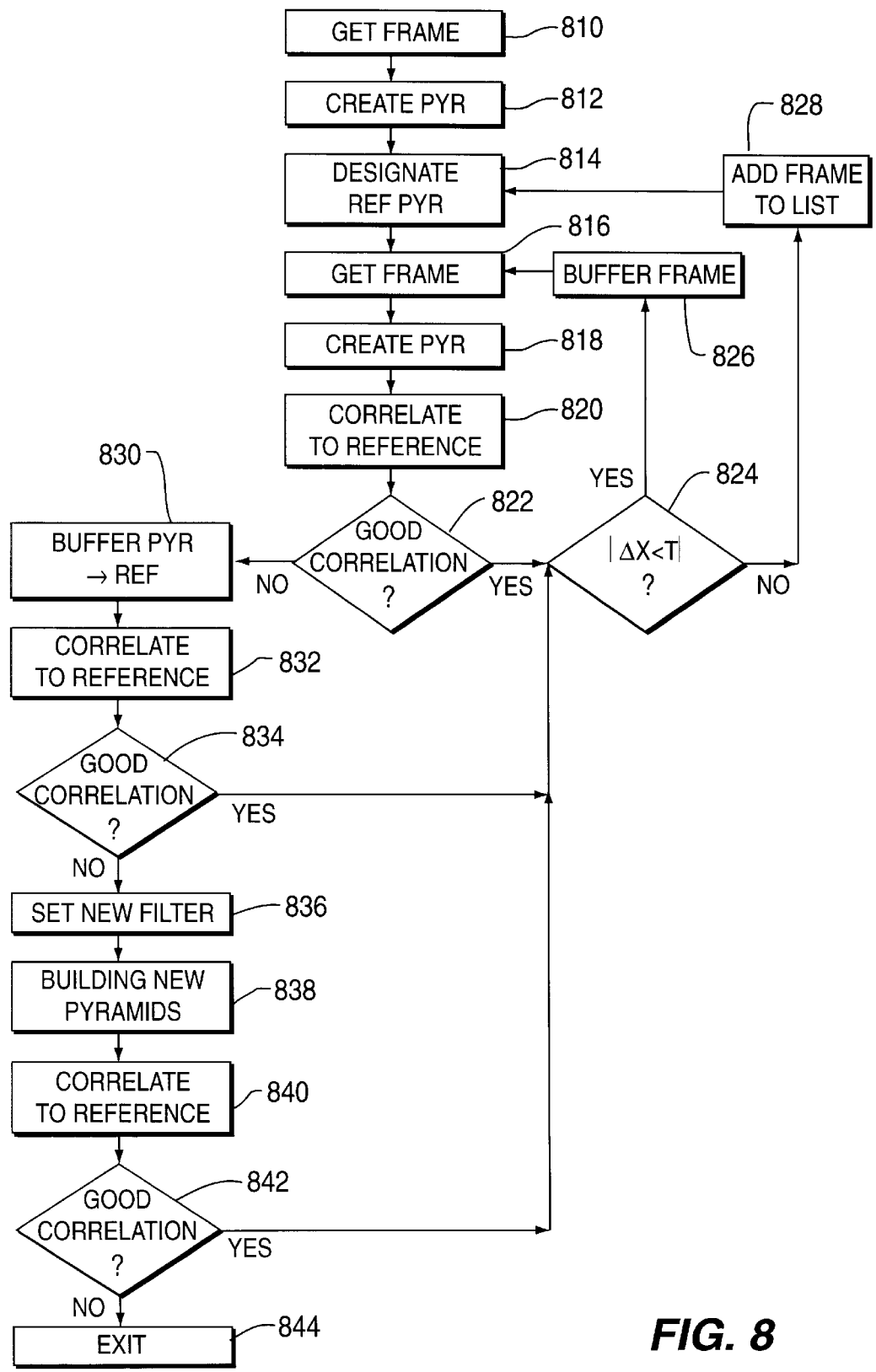
FIG. 8 is a flow-chart diagram of a process which is suitable for use as the front-end alignment process shown in FIG. 7.

An exemplary embodiment of this front-end alignment process is illustrated in FIG. 8. It involves two principles of operation: adaptive image sampling and adaptive filter selection. Other embodiments may be based on these or similar principles.

Since the MAC logically includes the first and last image of the input image stream, the process starts by designating the first captured image as the first component of the MAC and the initial reference image (RI). The RI is used to align each of the incoming images successively until either 1) the estimated overlap between the incoming image and the RI is less than some threshold value (for example, 50% of the image dimension) or 2) an alignment error is detected. The amount of image overlap selected balances the desire to minimize the number of images in the MAC and the desire to provide sufficient overlap for the back-end alignment process to refine the alignment. Alignment can be performed using any efficient image-based alignment technique such as those described above with reference to FIGS. 1 through 3. For efficiency and robustness, a multiresolution image correlation technique may be used.

In FIG. 8, an image is received from the digitized image stream 714 at step 810. The process generates a pyramid description of the image at step 812 and, at step 814, designates this pyramid as the reference pyramid. Next, at step 816, the process retrieves the next frame from the stream 714. At step 818, the process generates a pyramid description for this image. At step 820, the process correlates the newly generated pyramid description of the current image to the pyramid description of the reference image. At step 822, if the detected correlation between the images is good, control passes to step 824 which determines whether the displacement ($\Delta x$) between the two images is less than a threshold. If it is, then the overlap between the current image and the reference image is larger than is desirable, so the frame is put into a buffer at step 826, and control is returned to step 816 to test a new image from the stream 714.

If, at step 824, the displacement is greater than the threshold then step 828 is executed which adds the frame to the MAC and designates the pyramid for the newly added frame as the reference pyramid.

If, however, at step 822, there was not a good correlation between the current image and the reference image, step 830 is executed which designates the most recently buffered image as the reference image. Because this image is buffered, it is assured to have a sufficient overlap (a displacement less than the threshold). At step 832, the current image is correlated to the new reference image. If, at step 834, a good correlation is detected, then the process transfers control to step 824, described above. Otherwise, step 836 is executed which defines a new spatial filter for processing the input image. At step 838, a pyramid representation of the newly processed image is built. At step 840, this pyramid representation is correlated to the reference pyramid. If, at step 842, a good correlation is detected, then control transfers to step 824. Otherwise, an image alignment failure has occurred and the process terminates at step 844.

Figure 9:
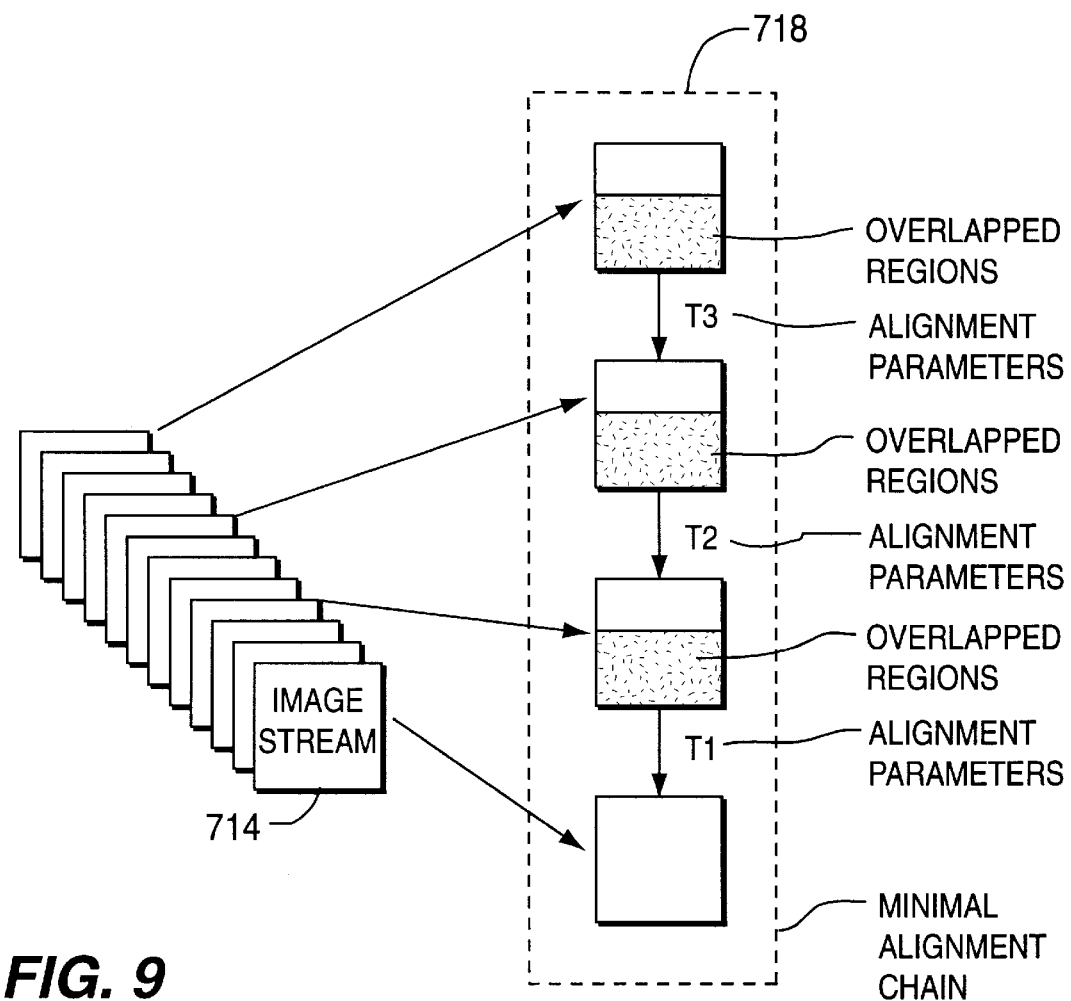
FIG. 9 is a diagram illustrating images that are processed by the system which is useful for describing the front-end alignment process shown in FIG. 7.

As shown in FIG. 8, images that are successfully aligned are simply buffered until the displacement between the current and reference images is exceeded, indicating that the overlap between the images is less than a maximum value. When this occurs the current image is added to the MAC data structure and is designated the new RI. If no alignment failures are detected, this process simply proceeds until all images have been aligned and the complete MAC has been constructed. At this point the MAC consists of a sequence of input images including the first and last image of the original input sequence and a sequence of alignment parameters that align each image of the MAC to the preceding image. Furthermore, the images of the MAC have the property that each overlaps the preceding image by approximately the amount determined by the overlap threshold value. FIG. 9 illustrates a possible relationship between the input image stream 714 and the MAC 718.

At some point during the construction of the MAC the alignment process may fail to return an acceptable set of alignment parameters. This may occur for a variety of reasons deriving from the image capture process (image noise, dropouts, glare, rapid or irregular camera motion), image content (a moving or occluding object), image processing (inappropriate image filtering), or other uncontrollable environmental factors. Alignment failure can be detected by a variety of criteria some of which are specific to the particular alignment process selected. In the exemplary embodiment of the invention, alignment error is detected at step 822, based on large residual error after alignment, inconsistent estimates from different image subregions, or estimated alignment parameters lying outside of expected range. When one of these conditions occurs, it is necessary either to modify the alignment process itself or to change the image to which alignment is being attempted (RI) in order to prevent breaking the alignment chain.

In the exemplary embodiment this adaptation occurs in two steps. First, as indicated at step 830 of FIG. 8, the most recent successfully aligned image is designated the RI and added to the MAC. Correlation is then attempted between the current image and this new reference. If this correlation succeeds the process proceeds as described above. We are guaranteed that the structure so created will fulfill the requirements for a MAC because the newly designated RI is well aligned to the previous RI and has an overlap that produces good correlation but is less than a specified maximum overlap threshold. If alignment to the new RI fails (at step 834) the process attempts to change the filters used to generate the image pyramid used in the alignment process. These new image pyramids (one for the RI and one for the current image) are used to compute image alignment. If this alignment succeeds the process continues as described above. If alignment fails with the modified filters, the front end process exits and returns an error condition.

The filter selection performed by the exemplary process is related to an assumption about image content. Filters that are appropriate for representing lines on a whiteboard may not be appropriate for representing patterned wallpaper or the furniture in a room. Therefore, when alignment failure is detected the assumption is made that it may be due to a change in the nature of image content. Filters appropriate for a different type of image content are therefore substituted in an effort to achieve more effective image representation and therefore more accurate image alignment. Although the exemplary process shows only one filter selection step, it is contemplated that multiple filter selection steps may be accommodated by branching back (not shown) from the no output of decision step 842 to step 834.

Figure 10A:
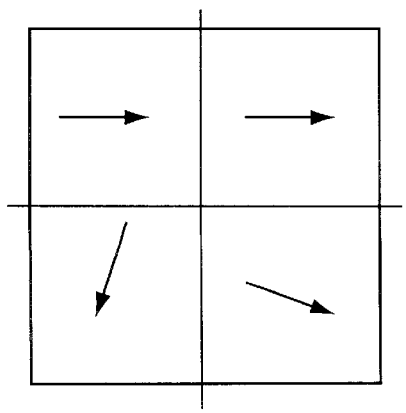
FIGS. 10A and 10B are image diagrams which are useful for describing the operation of the front-end alignment process shown in FIG. 7.
Figure 10B:
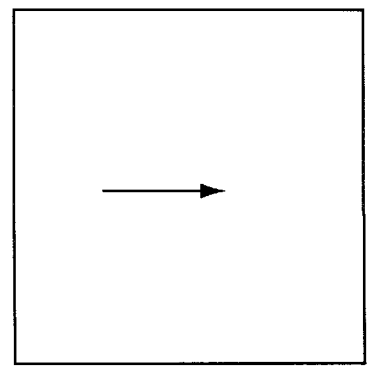

The frame-to-frame alignment process used in the exemplary embodiment computes the image displacement yielding the minimum absolute difference (MAD) between the current and reference images. This involves summing the difference at each pixel between the shifted current image and the reference image and finding the shift that minimizes this difference. This is a standard technique which approximates the behavior of sum of squared difference (SSD) minimization methods. As shown in FIGS. 10A and 10B, however, in order to 1) compute global image alignment robustly in the presence of local misalignments and 2) better detect alignment failures, the exemplary method computes the MAD separately for each of a set of image subregions (FIG. 10A) as well as for the image as a whole (FIG. 10B). This process allows information about the state of the alignment process to be derived from comparison of these various estimates. It also allows rejection of spurious local estimates if they do not agree with the others.

The exemplary embodiment of the front-end correlation process is illustrated in FIG. 11A. The exemplary process uses pyramid-based coarse-fine refinement to calculate accurate alignment estimates efficiently. This process first uses an analysis of the agreement between the individual subregion estimates to decide whether an acceptable initial estimate of the alignment parameters has been achieved. The criterion used to determine whether the initial estimate is acceptable combines a measure of the agreement among the estimates with a measure of the total amount of residual image difference as represented by the global minimum absolute difference.

In FIG. 11A, the pyramid representations of the current and reference images are obtained at step 1110. At step 1112, the variable Pyr Level is set to Max Level, the highest level of the pyramids. The global and regional MADs for the reference image and the current image are calculated at step 1114. At step 1116, the global MAD and the number of agreements between the region MADs and the global MAD are calculated. At step 1118, the global MAD and the number of agreements (#A) are compared to an acceptance region, R, to determine if the estimate is acceptable. The acceptance region is illustrated in FIG. 11B.

If the global MAD is very low (less than a threshold, $T_{low}$) a minimum number of agreements between the subregion alignment estimates and the global alignment estimate are required for the alignment to be judged acceptable. If the global MAD is in an intermediate range (between $T_{low}$ and a second threshold, $T_{high}$) a larger number of agreements are required. If the global MAD is very large (greater than $T_{high}$) then a still larger number of agreements are required. Agreement between the global and subregion alignment estimates is determined by comparing the difference between the estimates to a third threshold value. This threshold value is scaled with the overall magnitude of the displacement so that the tolerance is approximately constant in relative magnitude.

If the initial estimate is accepted, that is, if the number of agreements and the global MAD cause the criterion to be met, then this initial estimate may be refined through a coarse-fine process. In the exemplary embodiment, this process involves searching at each higher resolution pyramid levels for a more accurate alignment estimate. The first step in this search, step 1120, sets the variable Pyr Level to the next lower level. In the next step, step 1122, the global and subregion MAD values are calculated within a range around each of the values (global and subregion) computed at the previous level. For each subregion and for the image as a whole the alignment estimate which yields the best (i.e. lowest value) absolute difference is chosen at step 1124. If, at step 1126, there are more levels in the pyramids, control is transferred to step 1120 and the set of displacement values computed in this way is then used to refine the correlation at the next level. When the last pyramid level is reached the best global estimate is selected and returned at step 1128.

Different choices can be made about the filters that are used to generate the pyramid representations for coarse-fine alignment. These choices are made primarily based on the type of content expected in the input image sequence. The goal of the selection is to generate a pyramid structure in which the low resolution pyramid levels preserve sufficient image structure to allow accurate alignment. For example, if a pyramid (either Gaussian or Laplacian) is generated in the usual way with input images consisting of relatively thin lines on a white background (as in the case of an image of writing on a whiteboard), the low resolution pyramid levels will show very little structure because the lines will have very little contrast after low-pass filtering.

One solution to this problem is to apply a non-linear pre-filter to the input images. For example, if the input image may be filtered to extract edge structure, compared to a threshold on a pixel-by-pixel basis, and then subjected to a distance transform to spread out the image structure prior to pyramid generation, then the resulting pyramid will have much more usable content at low resolution levels. On the other hand, this pre-processing step may not be effective for outdoor scene structure which, typically does not contain strong edges. In order to function robustly in varied environments (or when the image sequence moves from one type of scene structure to another), an adaptive selection of pre-filter type is made. In the exemplary embodiment (as shown in FIG. 8) a change of pre-filter is made if alignment fails even after selection of a new reference image. Alignment is then attempted using this new pyramid. If this also fails the process returns an error condition and exits.

Once the front-end process has successfully computed a MAC, this data structure (the member images and the linking alignment parameters) is passed to the back-end alignment process for final alignment. The goal of the back-end alignment process is to produce a set of alignment parameters that accurately align each of the images contained in the MAC to a single mosaic coordinate system. In general, the coordinate transformations underlying the alignment process in the back-end are different from those used in the front-end. This difference is driven by three factors: 1) the real-time processing constraints present in the front-end process are relaxed generally allowing more complex computation; 2) initial estimates of image—image alignment are provided as part of the MAC generally allowing stable computation of more complex models; and 3) the coordinate transformations should precisely map all images to a single coordinate system, generally requiring more complex transformation models than are used for frame-to-frame alignment.

The process of constructing the mapping from each MAC frame to the single mosaic coordinate system involves 1) choice of the mosaic coordinate system, 2) choice of a parametric or quasi-parametric image transformation model and 3) computation of each frame's relationship to the mosaic coordinate system via this selected transformation. In the exemplary embodiment, the process begins by using the MAC to establish both a mosaic coordinate system and an initial mapping of each frame to the coordinate system. This mapping is then refined through an incremental process in which for each frame in turn alignment parameters are estimated. An alternative mechanism is simultaneously to align all frames to the selected coordinate system as described, for example, in U.S. Provisional Patent Application Ser. No. 60/030,892, entitled "Multi-View Image Registration With Application to Mosaicing and Lens Distortion Correction" which is incorporated herein by reference for its teaching on image registration. The choice of incremental or sequential alignment in this instance is driven mostly by a need for reduction in computational complexity and the corresponding decrease in processing time. This sequential process is referred to below as "frame-to-mosaic" processing.

Figure 15:
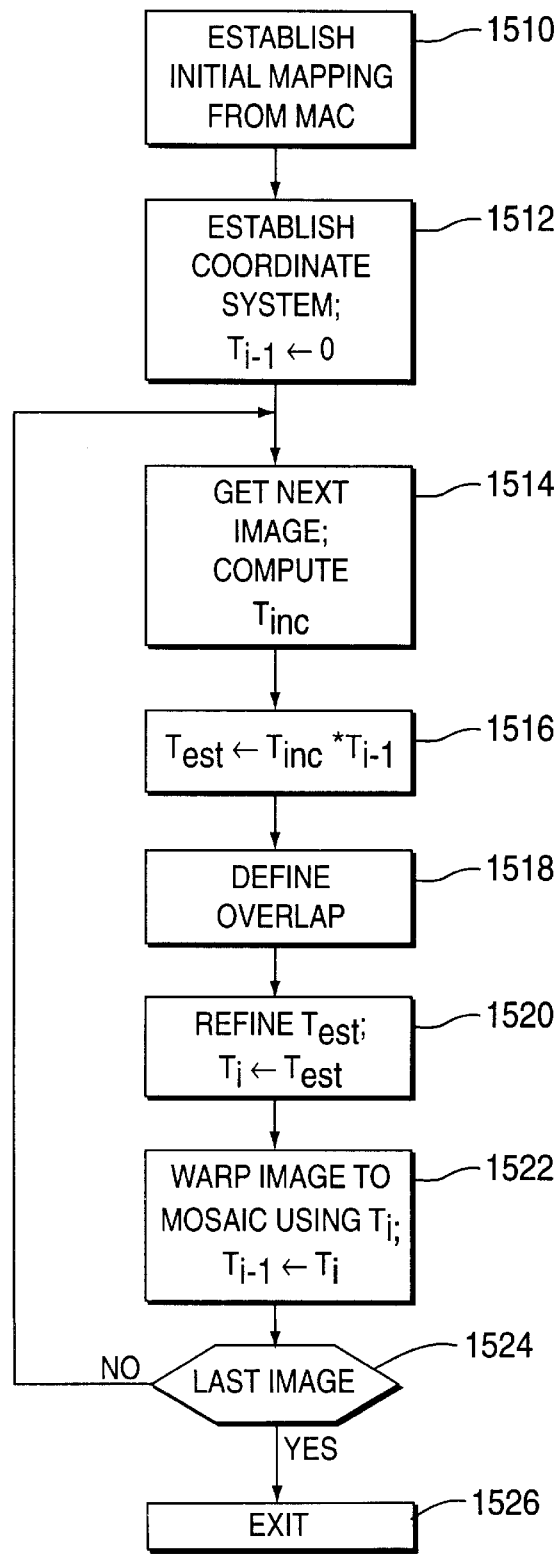
FIG. 15 is a flow-chart diagram of a process suitable for use as the back-end alignment process shown in FIG. 7.

The back-end process is illustrated in FIG. 15. As a first step, 1510, the process creates an initial working mosaic from the MAC. In the exemplary embodiment, the alignment parameters provided by the front-end as part of the MAC are simply translation vectors relating each frame to the previous one. To create the initial working mosaic the image frames are shifted in accordance with these translation vectors such that the position of the upper left corner of each frame with respect to the mosaic coordinate system is given by the vector sum of all of the translation vectors up to that point in the sequence. In other words, the process simply "deals out" the image frames so that each frame overlaps the previous as specified by the alignment parameters in the MAC. In the case of a more general transformation specified in the MAC, the process may compose the frame-to-frame transformations to produce an initial frame-to-mosaic transformation for each frame.

Once this initial mapping is established, the process, at step 1512, selects an image to serve as a starting point for the sequential frame-to-mosaic alignment process. This image defines the coordinate system of the mosaic. In general this selection can be made based on a variety of criteria including estimated position, image content, image quality, and/or user selection. In the exemplary implementation the process selects the source image which has a center that is closest to the centroid of the bounding rectangle of image positions as defined by the initial working mosaic. This image forms the initial mosaic. The reason for this selection is to minimize distortion of transformed image frames at the edges of the image following final alignment. In the case of a more general image-to-image transformation being provided by the front-end alignment process as part of the MAC it may be desirable to recompute the initial working mosaic coordinate system to leave the selected starting image undistorted.

The choice of parametric or quasi-parametric image-to-mosaic transformation depends both on the nature of the input images and the nature of the mosaic image to be constructed. This is described in a paper by J. R. Bergen, P. Anadan, K. J. Hanna and R. Hingorani entitled "Hierarchical Model-Based Motion Estimation" *European Conference on Computer Vision*, May, 1992 which is incorporated herein by reference for its teachings on parametric and quasi-parametric image to mosaic transformations. For example, if the images are collected from a camera undergoing predominately rotational rather than translational motion then the images can be aligned with a projective transformation. However, if the angular field of view approaches 180 degrees, transforming all of the images to lie on a single flat image plane will result in extreme distortion of input images lying far from the center of the mosaic image. In the current embodiment, the image transformation selection is made explicitly by the user in order to achieve the desired effect. In principle, however, it could be made automatically based on analysis of the input images and the types of transforms needed to align the images to the common coordinate system.

The frame-to-mosaic alignment process begins at step 1512 by designating the starting frame mapped to the mosaic coordinate system as the initial mosaic. At step 1514, the process selects a next frame to be added to the mosaic. In the exemplary embodiment, frames are added in the order in which they occur in the MAC moving forward and backward from the starting frame. Thus if the starting frame were frame 10 of a total of frames 1 through 20 the order of assembly may be 10, 11, 12, 13, . . . 20, 9, 8, 7, . . . , 1. Alternatively, the process may assemble the frames in some order derived from their positions in the initial working mosaic (for example, in order of their increasing distance from the starting frame).

Figure 13:
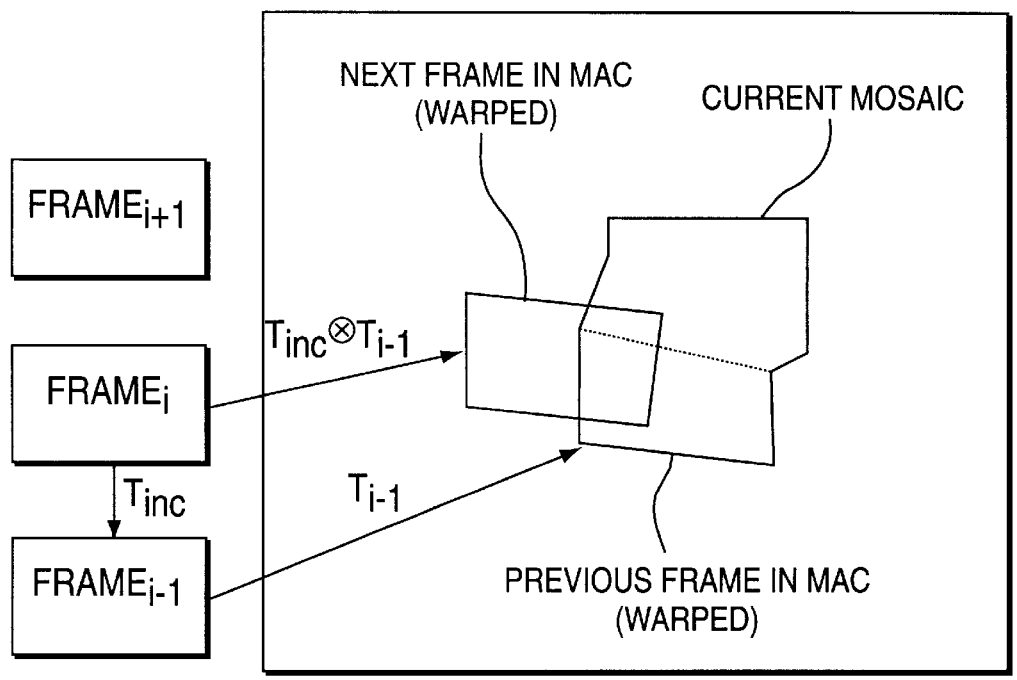
FIG. 13 is a diagram of images which is useful for describing a first alternative back-end alignment process suitable for use in the block diagram shown in FIG. 7.

For each frame in the sequence, an initial alignment to the mosaic coordinate system is computed at step 1516 by calculating alignment parameters with the previous frame in the sequence (that is, with the frame that was previously aligned to the mosaic). We designate this set of alignment parameters, $T_{inc}$, the incremental transformation. At step 1515, this transformation is composed with the transformation that was used to align the previous frame to the mosaic, $T_{i-1}$, to produce an estimate, $T_{est}$, of the transformation that will align the current frame to the mosaic. This process is illustrated in FIG. 13. Using the estimated transformation, $T_{est}$, the process, at step 1518, defines a region in which the current frame overlaps the mosaic.

Figure 14:
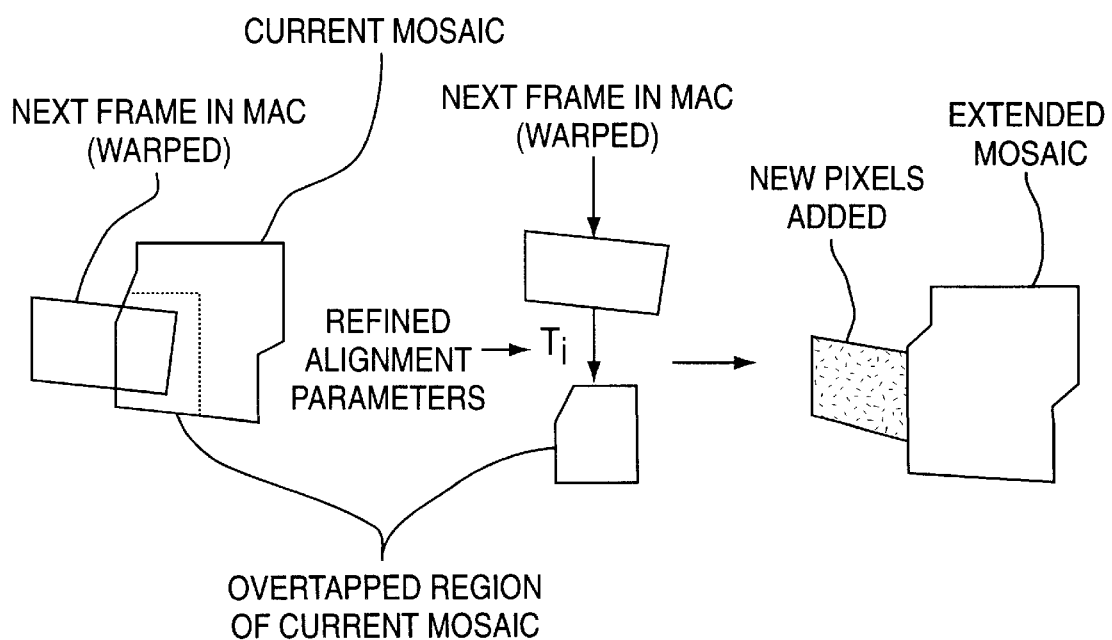
FIG. 14 is a diagram of images which is useful for describing a second alternative back-end alignment process suitable for use in the block diagram shown in FIG. 7.

This estimate is then refined, at step 1520, by alignment to the overlapping region of the current mosaic as shown in FIG. 13. After this final alignment is computed the newly aligned frame is added to the working mosaic at step 1522 by warping the new image to the mosaic coordinate system and extending the working mosaic image with the warped pixels, as shown in FIG. 14. At step 1524, if the merged image was the last image to be processed in the MAC then the process terminates at step 1526. Otherwise, the process branches back to step 1514 to select the next image to be merged into the mosaic.

The alignment computations involved in the back-end alignment process can, in principle, be performed using any appropriate computational technique. In the exemplary embodiment of the invention the back-end alignment process uses a direct estimation method to estimate the alignment parameters, using Levenberg-Marquardt iteration in a multiresolution coarse-fine refinement process. This computational approach is chosen because it provides accurate and robust alignment estimates and is applicable over a range of image alignment models. It is also highly computationally efficient since it does not require explicit searching or feature extraction.

In order to reduce computational complexity the computation of $T_{inc}$ at step 1514, as illustrated in FIG. 12, is performed only at pyramid level 2. In general, this initial alignment computation can be carried out at whatever level yields an accuracy of estimate suitable to serve as an starting point for the final alignment of FIG. 13. The final alignment step 1520 is iterated at both pyramid levels 2 and 1. However, also to reduce computation time, the iteration at level 1 is performed only over a subset of the image area. This subset is selected by applying an "interest operator" to the reference image, thresholding the output of this operator and performing a non-maximum suppression operation. The result of this process is a pixel mask that controls accumulation of values used in the iteration process.

The principle underlying the type of interest operator used is that image points with large values of the image gradient contribute most strongly to determining the estimated alignment parameter values. This is true for many estimation procedures including Levenberg-Marquardt, Gauss-Newton and other commonly used techniques. Consequently, in the exemplary embodiment, the process computes the image gradient magnitude at pyramid level 1, applies a threshold to this and then eliminates all points that are less than the threshold and then further eliminates all points except the largest values within a window of specified size. The result of this process is a relatively sparse mask (i.e. one that admits only a small fraction of images points) but one that represents areas of the image that contribute strongly to the alignment parameter estimate.

In general, other selection methods can be applied that achieve this same purpose. It is contemplated, for example, that the selection criteria may be formulated so that a fixed number of points are included in the mask (for example by adaptively varying the threshold) so that the computational cost of final alignment becomes approximately independent of input image size.

Figure 7:
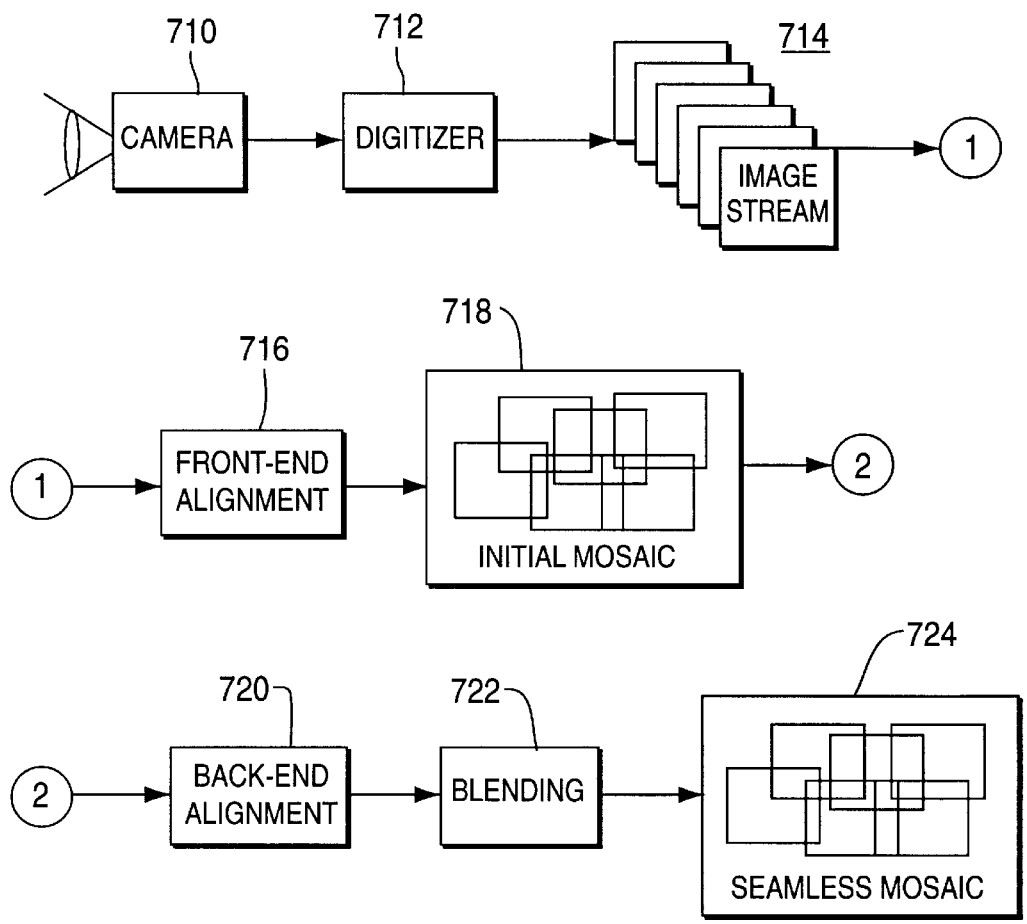
FIG. 7 is a block diagram which is useful for describing an exemplary embodiment of the invention.

As a final step in the exemplary process, step 722 of FIG. 7, the various aligned images are merged to form the seamless mosaic image 724. Any of the techniques described above may be used to merge the aligned images to form a single mosaic image.

Conclusion

A method is defined for automatically selecting source image segments for inclusion in the mosaic from the set of available source images in overlapped regions. The basic system includes a method which combines a set of source images into a mosaic comprising the steps of (i) aligning source images, (ii) enhancing source images, (iii) selecting source image regions, (iv) merging regions. Other types of systems are also contemplated, these include:

1) A system in which the mosaics are constructed continuously as video frames are received where the mosaic may be displayed continuously as video as the image is constructed.
2) A system that performs the construction on all (or many) of the source frames at once.
3) A system that allows a user to adjust and edit a mosaic, and that regenerates the mosaic after each such edit, or on demand where edits may include shifting, cutting, pasting, and enhancing the source images.
4) A system that generates a first version of a mosaic at somewhat reduced quality (to reduce computation and increase speed). Once final component images of the mosaic are selected by the user, the composite image is regenerated at higher quality. In this instance, initial generation may use multiple applications of warps, for example, or incremental alignment and merging, while the final mosaic repeats these operations working directly from the source frames.

5) A system that generates the mosaic only when it is needed where the user specifies a desired frame of reference, and a mosaic is constructed. In this instance, the algorithm typically computes all the alignments first as an incremental or batch process, then regenerates the mosaic on demand from a desired perspective. (This is done to avoid extra warps.)

It is to be understood that the apparatus and method of operation taught herein are illustrative of the invention. Modifications may readily be devised by those skilled in the art without departing from the invention.

We claim:

1. A computer implemented method of constructing an image mosaic comprising the steps of:

a) receiving a plurality of source images;
   b) analyzing the received source images to select ones of the source images to use in the image mosaic and to form an initial alignment of the selected source images;
   c) analyzing the selected source images to establish a coordinate system for the image mosaic;
   d) aligning ones of the selected source images to the coordinate system, including the steps of
      calculating an error function which includes alignment errors for at least two of the selected source images; and
      warping the at least two of the selected source images to reduce the error function; and
   e) merging the aligned images to form the image mosaic.

2. A method according to claim 1 wherein step b) includes the steps of:

b1) calculating an image coordinate transformation between one image of the received images and a previously selected image;
   b2) identifying an overlap region between the one image and the previously selected image responsive to the transformation;
   b3) determining a number of picture elements (pixels) in the overlap region; and
   b4) selecting the one image to use in the image mosaic if the number of pixels in the overlap region is within a predetermined range of values.

3. A method according to claim 2 wherein the step b1) comprises the iterative steps of:

filtering the one image according to a selected filter characteristic;
   generating a measure of correlation between the filtered one image and the previously selected image; and
   comparing the measure of correlation to a threshold value and if the measure of correlation is less than the threshold value, selecting a different filter characteristic;
   continuing the iterative steps until the measure of correlation is greater than the threshold value or no further filter characteristic is available for selection.

4. A method according to claim 1, wherein step b) includes the steps of:

calculating a measure of quality for each of the received images; and
   excluding from selection any image having a measure of quality which less than a predetermined threshold value.

5. A method according to claim 1, wherein:

the received images are provided from a moving camera;
   step b) includes the steps of:
      determining motion of the moving camera; and
      initiating the selection of received images responsive to a first change in the camera motion; and
      terminating the selection of received images responsive to a second change in the camera motion.

6. A method according to claim 1 wherein:

step c) establishes the coordinate system for the image mosaic relative to one of the images that is centrally located in the initial alignment of the source images.

7. A method according to claim 1 wherein:

step b) selects images by correlating a portion of each image to a previously selected image to form an initial mosaic alignment; and
   step c) selects multiple overlapping images from the initial mosaic and defines the coordinate system as a minimum mapping from all of the selected multiple images.

8. A method according to claim 1 wherein step d) includes the steps of d1) forming an approximate alignment of all of the selected source images;
   d2) calculating the error function which includes alignment errors at least for regions in which ones of the selected images overlap; and
   d3) iteratively refining the approximate alignment to reduce the error function.

9. A method according to claim 8 wherein step d1) includes the steps of:

designating one of the selected images as being in the mosaic;
   aligning each successive image to the mosaic;
   incorporating each aligned image into the mosaic.

10. A method according to claim 8 wherein step d1) includes the steps of:

designating a first one of the selected images as being in the mosaic;
    aligning a second one of the selected images to the first selected image to generate a first alignment transform which aligns the second image to the mosaic;
    aligning a third one of the selected images to the second selected image to generate a second alignment transform; and
    composing the first and second alignment transforms to generate a composite alignment transform which aligns the third image to the mosaic.

11. A method according to claim 8 wherein step d2) employs multiresolution alignment techniques.

12. A method according to claim 81, wherein the multiresolution alignment techniques include the steps of:

defining respective pyramid representations of overlapping portions of the aligned mosaic image;
    processing image data in the overlap region using respective pyramid levels which are at a level that is higher than a predetermined pyramid level in pyramid representation to provide an initial transformation;
    transforming the mosaic according to the initial transformation;
    generating pyramid representations of sub-mosaic images representing respective portions of the overlap regions;
    processing image data of the sub-mosaic images using the pyramid levels to provide a refined transformation.

13. A method according to claim 8, wherein:
step d2) includes the steps of:
calculating a global alignment error as the error function over the aligned mosaic image;
defining respective match error surfaces for all pairs of overlapping frames; and
step d3) includes the steps of:
calculating a set of transforms over all pairs of overlapping frames which tends to reduce the error function; and
warping ones of the image frames that are affected by the calculated transforms to obtain a refined aligned mosaic image.

14. A method according to claim 1, further including, between steps d) and e), the step of defining respective regions of the selected images to be used in the mosaic image.

15. A method according to claim 14, wherein the step of defining respective regions of the selected images to be used in the mosaic image includes the steps of:
identifying sets of mutually overlapping images;
defining a measure of quality of each image of the set of mutually overlapping images;
for each region in which overlap exists, identifying one of the images containing the overlap region in which has the overlap region has the greatest measure of quality and selecting a region which includes the overlap region from the identified image.

16. A method according to claim 14, wherein the step of defining respective regions of the selected images to be used in the mosaic image includes the steps of:
defining a Voronoi tessellation for the image mosaic;
selecting respective images having a common vertex in the Voronoi tessellation to contribute regions to the image mosaic.

17. A method according to claim 14, wherein the step of defining respective regions of the selected images to be used in the mosaic image includes the steps of:
identifying sets of mutually overlapping images;
calculating, at a picture element (pixel) level, a measure of misalignment across all of the overlapping images;
for each overlap region, defining a cut-line as a locus of pixels having a minimal measure of misalignment;
defining the regions in the respective images relative to the cut-lines.

18. A method according to claim 1, wherein step e) includes the steps of:
applying a reversible transform to all picture elements (pixels) of the image mosaic;
merging the pixels of the image mosaic using multiresolution merging techniques;
reversing the transform on the merged mosaic.

19. A method according to claim 18 wherein the multiresolution merging techniques use only Laplacian pyramids.

20. A method according to claim 1, wherein the source images are color images and the image mosaic is a color image having a luminance component and at least one chrominance component, wherein, steps a), b), c) and d) are performed using only the luminance component and step e) is performed using the luminance component and the chrominance component.

21. A method according to claim 19, wherein step e) includes the steps of:
converting the luminance and chrominance components to primary color signal components;
identifying a reference image;
identifying portions of the reference image which overlap ones of the selected images;
defining an objective function representing a measure of difference among respective color signal vectors of each of the overlapping images at each corresponding point in the overlapping portions of the images;
calculating an affine color space transformation which mimimizes the objective function;
performing multiresolution merging separately on each of the primary signal components.

22. A computer implemented method of aligning a plurality of source images comprising the steps of:
a) analyzing the source images to select ones of the source images to align and to form an initial alignment of the source images;
b) analyzing the selected source images to establish a coordinate system for the image mosaic;
c) aligning ones of the selected source images to the coordinate system including the steps of:
calculating an error function which includes alignment errors for all of the selected source images with respect to the coordinate system; and
warping ones of the selected source images to reduce the error function.

23. A method according to claim 22 wherein step a) includes the steps of:
a1) calculating an image coordinate transformation between one image of the received images and a previously selected image;
a2) identifying an overlap region between one image of the source images and a previously selected image responsive to the transformation;
a3) determining a number of picture elements (pixels) in the overlap region; and
a4) selecting the one image to use in the image mosaic if the number of pixels in the overlap region is within a predetermined range of values.

24. A method according to claim 23 wherein the step a1) comprises the iterative steps of:
filtering the one image according to a selected filter characteristic;
generating a measure of correlation between the filtered one image and the previously selected image; and
comparing the measure of correlation to a threshold value and if the measure of correlation is less than the threshold value, selecting a different filter characteristic;
continuing the iterative steps until the measure of correlation is greater than the threshold value or no further filter characteristic is available for selection.

25. A method according to claim 22, wherein step a) includes the steps of:
calculating a measure of quality for each of the received images; and
excluding from selection any image having a measure of quality which is less than a predetermined threshold value.

26. A method according to claim 22 wherein step b) establishes the coordinate system for the image mosaic relative to one of the images that is centrally located in the initial alignment of source images.

27. A method according to claim 22 wherein:
step a) selects images by correlating a portion of each image to a previously selected image to form an initial mosaic alignment; and step b) selects multiple overlapping images from the initial mosaic and defines the coordinate system as a minimum mapping from all of the selected multiple images.

28. A method according to claim 22 wherein step c) includes the steps of c1) forming an approximate alignment of the selected source images; and c2) iteratively refining the approximate alignment to reduce the error function at least in regions in which ones of the selected source images overlap.

29. A method according to claim 28 wherein step c1) includes the steps of:

designating one of the selected images as being in the mosaic;

aligning each successive image to the mosaic;

incorporating each aligned image into the mosaic.

30. A method according to claim 28 wherein step c1) includes the steps of:

designating a first one of the selected images as being in the mosaic;

aligning a second one of the selected images to the first selected image to generate a first alignment transform which aligns the second image to the mosaic;

aligning a third one of the selected images to the second selected image to generate a second alignment transform; and composing the first and second alignment transforms to generate a composite alignment transform which aligns the third image to the mosaic.

31. A system for constructing an image mosaic comprising:

means for receiving a plurality of source images;

selecting means for analyzing the received source images to select ones of the source images to use in the image mosaic and to form an initial alignment of the source images;

referencing means for analyzing the selected source images to establish a coordinate system for the image mosaic;

aligning means for aligning ones of the selected source images to the coordinate system including:
 means for calculating an error function which includes alignment errors for all of the selected source images with respect to the coordinate system; and
 means for warping ones of the selected source images to reduce the error function; and means for merging the aligned images to form the image mosaic.

32. A system according to claim 31 wherein the selecting means includes:

means for calculating an image coordinate transformation between one image of the received images and a previously selected image;

means, responsive to the coordinate transformation, for identifying an overlap region between one image of the received images and a previously selected image;

means for determining a number of picture elements (pixels) in the overlap region; and means for selecting the one image to use in the image mosaic if the umber of pixels in the overlap region is within a predetermined range of values.

33. A system according to claim 32 wherein the means for selecting comprises:

means for filtering the one image according to a selected one of a set of respectively different filter characteristics;

means for generating a measure of correlation between the filtered one image and the previously selected image; and means for comparing the measure of correlation to a threshold value.

34. A system for aligning a plurality of source images comprising:

a) selection means for analyzing the source images to select ones of the source images to align and to form an initial alignment of the source images;

b) reference means for analyzing the selected source images to establish a coordinate system for the image mosaic;

c) aligning means for aligning ones of the selected source images to the coordinate system including
 means for calculating an error function which includes alignment errors for all of the selected source images with respect to the coordinate system; and
 means for warping ones of the selected source images to reduce the error function.

35. A system according to claim 34 wherein the selection means includes:

means for calculating an image coordinate transformation between one image of the received images and a previously selected image;

means, responsive to the coordinate transformation, for identifying an overlap region between one image of the received images and a previously selected image;

means for determining a number of picture elements (pixels) in the overlap region; and means for selecting the one image to use in the image mosaic if the number of pixels in the overlap region is within a predetermined range of values.

36. A system according to claim 35 wherein the means for selecting comprises:

means for filtering the one image according to a selected one of a set of respectively different filter characteristics;

means for generating a measure of correlation between the filtered one image and the previously selected image; and means for comparing the measure of correlation to a threshold value.

37. A computer readable medium containing a program which causes a computer to generate an image mosaic of aligned source images, the program causing the computer to perform the steps of:

a) analyzing the source images to select ones of the source images to align and to form an initial alignment of the source images;

b) analyzing the selected source images to establish a coordinate system for the image mosaic;

c) aligning ones of the selected source images to the coordinate system including the steps of:
 calculating an error function which includes alignment errors for all of the selected source images with respect to the coordinate system; and
 warping ones of the selected source images to reduce the error function.

38. A computer readable medium according to claim 37 wherein step a) includes the steps of:

a1) calculating an image coordinate transformation between one image of the received images and a previously selected image;

a2) identifying an overlap region between one image of the source images and a previously selected image responsive to the coordinate transformation;

a3) determining a number of picture elements (pixels) in the overlap region; and a4) selecting the one image to use in the image mosaic if the number of pixels in the overlap region is within a predetermined range of values.

39. A computer readable medium according to claim 38 wherein the step a1) comprises the iterative steps of:

filtering the one image according to a selected filter characteristics during each iteration;

generating a measure of correlation between the filtered one image and the previously selected image; and comparing the measure of correlation to a threshold value and if the measure of correlation is less than the threshold value, selecting a different filter characteristic;

until the measure of correlation is greater than the threshold value or no further filter characteristic is available for selection.

* * * * *

UNITED STATES PATENT AND TRADEMARK OFFICE
CERTIFICATE OF CORRECTION

PATENT NO. : 6,075,905
DATED : June 13, 2000
INVENTOR(S) : Joshua Randy Herman et al.

It is certified that error appears in the above-identified patent and that said Letters Patent is hereby corrected as shown below:

Title page,
Section [22], the filing date 'Jul. 18, 1997' should read -- Jul. 16, 1997 --.

Column 26,
Line 53, of the Letters Patent, "claim 81" should read -- claim 11 --.

Column 27,
Line 64, of the Letters Patent, 'claim 19' should read -- claim 20 --.

Signed and Sealed this

Ninth Day of October, 2001

Attest:

*Nicholas P. Godici*

NICHOLAS P. GODICI
*Attesting Officer*   *Acting Director of the United States Patent and Trademark Office*